(12) United States Patent
Tang et al.

(10) Patent No.: US 11,540,309 B2
(45) Date of Patent: Dec. 27, 2022

(54) DATA TRANSMISSION METHOD AND APPARATUS

(71) Applicant: GUANGDONG OPPO MOBILE TELECOMMUNICATIONS CORP., LTD., Guangdong (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/489,550

(22) Filed: Sep. 29, 2021

(65) Prior Publication Data

US 2022/0022240 A1     Jan. 20, 2022

Related U.S. Application Data

(63) Continuation of application No. 16/472,074, filed as application No. PCT/CN2016/111836 on Dec. 23, 2016, now Pat. No. 11,219,055.

(51) Int. Cl.
*H04W 72/12* (2009.01)

(52) U.S. Cl.
CPC ... *H04W 72/1289* (2013.01); *H04W 72/1268* (2013.01); *H04W 72/1273* (2013.01)

(58) Field of Classification Search
CPC ......... H04W 72/1289; H04W 72/1268; H04W 72/1273
USPC ................... 370/310, 328, 329, 330
See application file for complete search history.

(56) References Cited

U.S. PATENT DOCUMENTS

| | | |
|---|---|---|
| 2014/0153539 A1 | 6/2014 | Seo |
| 2016/0352551 A1 | 12/2016 | Zhang |
| 2016/0353423 A1* | 12/2016 | Li .................... H04W 72/044 |
| 2016/0353476 A1 | 12/2016 | Sartori et al. |
| 2017/0041907 A1 | 2/2017 | Seo et al. |
| 2017/0347343 A1 | 11/2017 | Seo et al. |

(Continued)

FOREIGN PATENT DOCUMENTS

| | | |
|---|---|---|
| CN | 101917380 A | 12/2010 |
| CN | 101938748 A | 1/2011 |
| CN | 103780334 A | 5/2014 |

(Continued)

OTHER PUBLICATIONS

First Office Action of the Vietnamese application No. 1-2019-03611, dated Jul. 20, 2022.

(Continued)

*Primary Examiner* — Obaidul Huq
(74) *Attorney, Agent, or Firm* — Ladas & Parry, LLP

(57) ABSTRACT

Disclosed are a data transmission method and apparatus, which can improve the performance of a system. The method comprises: a terminal device receiving indication information sent by a network device, the indication information being used to indicate a first downlink scheduling time domain resource in a first time-frequency resource region, wherein frequency domain resources comprised in the first time-frequency resource region are a part of a system bandwidth; and the terminal device receiving, on a first downlink data time domain resource, data sent by the network device according to the indication information.

20 Claims, 7 Drawing Sheets

(56) References Cited

U.S. PATENT DOCUMENTS

2020/0083994 A1  3/2020  Marinier et al.

FOREIGN PATENT DOCUMENTS

| CN | 104244420 A | 12/2014 |
|---|---|---|
| EP | 3032862 A1 | 6/2016 |
| EP | 3282623 A1 | 2/2018 |
| EP | 2733875 B1 | 9/2018 |
| WO | 2012109542 A1 | 8/2012 |
| WO | 2016029690 A1 | 3/2016 |

OTHER PUBLICATIONS

First Office Action of the Mexican application No. MX/a/2019/007666, dated May 31, 2022.
Office Action of the Australian application No. 2016433340, dated Sep. 23, 2021.
Decision of Re Examination of the Taiwanese application No. 106142294, dated Aug. 31, 2021.
3GPP TSG-RAN WG1 Meeting #86bis R1-1611709 (labelled R1-1608957), Lisbon, Portugal Oct. 10-14, 2016; Source: ZTE, ZTE Microelectronics; Title: URLLC and eMBB frame structure and multiplexing, entire document.
3GPP TSG-RAN WG1 Meeting #87 R1-1612798, Nov. 14-18, 2016, Reno, USA; Source: Panasonic; Title: Scheduling considerations for dynamic resource sharing among numerologies in NR, entire document.
3GPP TSG RAN WG1 Meeting #87 R1-1612001, Reno, USA Nov. 14-18, 2016; Source: Intel Corporation; Title: Remaining details of signaling support for reserved resources, entire document.
Notice of opposition of the European application No. 16924838.2, issued on Mar. 17, 2022.
Third Office Action of the Canadian application No. 3047490, dated Mar. 30, 2022.
Mediatek Inc: "Multiplexing of PUCCH and other channels", 3GPP Draft; R1-1612140_Multiplexing of PUCCH and Other Channels, 3rd Generation Partnership Project (3GPP), Mobile Competence Centre; 650, Route Des Lucioles; F-06921 Sophia-Antipolis Cedex, France, vol. RAN WG1 , no. Reno, USA; Nov. 14, 2016-Nov. 18, 2016 Nov. 13, 2016 (Nov. 13, 2016), XP051176094, entire document.
LG Electronics: "Remaining details on Frame Structure", 3GPP Draft; R1-1611780 FS, 3rd Generation Partnership Project (3GPP), Mobile Competence Centre; 650, Route Des Lucioles; F-06921 Sophia-Antipolis Cedex; France, vol. RAN WG1, no. Reno, USA; Nov. 14, 2016-Nov. 18, 2016 Nov. 5, 2016 (Nov. 5, 2016), XP051190146, entire document.
Intel Corporation: "NR frame structure for forward compatibility", 3GPP Draft; R1-1609509 Intel NR Forward Compatibility, 3rd Generation Partnership Project (3GPP), Mobile Competence Centre; 650, Route Des Lucioles; F-06921 Sophia-Antipolis Cedex; France, vol. RAN WG1, no. Lisbon, Portugal; Oct. 10, 2016-Oct. 14, 2016 Oct. 9, 2016 (Oct. 9, 2016), XP051149548, entire document.
European Search Report in the European application No. 21187353.4, dated Oct. 7, 2021.
First Office Action of the Indonesian application No. P00201906223, dated Nov. 1, 2021.

* cited by examiner

DATA TRANSMISSION METHOD AND APPARATUS

CROSS-REFERENCE TO RELATED APPLICATIONS

This application is a continuation application of U.S. patent application Ser. No. 16/472,074 filed on Jun. 20, 2019, which is the U.S. national phase of PCT Application No. PCT/CN2016/111836 filed on Dec. 23, 2016, the disclosures of which are incorporated herein by reference in their entireties.

TECHNICAL FIELD

Embodiments of the disclosure relate to the field of communication, and more particularly to a data transmission method and device.

BACKGROUND

In an existing wireless communication system, for example, a Long Term Evolution (LTE) system, a sub-frame is taken as a scheduling unit. As illustrated in FIG. 1, first few symbols in each sub-frame may be configured as control channel resources, and the control channel resources span the whole system bandwidth on a frequency domain. A starting symbol of a data transmission resource is usually a first symbol immediately next to a control channel resource, and an ending symbol of the data transmission channel is usually an ending symbol of a sub-frame. Therefore, a length of a data transmission resource on a time domain is kept unchanged in a sub-frame and on the whole system bandwidth.

A future wireless communication system (for example, 5th-Generation (5G)) focuses on supporting higher system performance, and is required to support various service types, different deployment scenarios and a wider spectral range. How to improve system performance is a research hot spot in this field.

SUMMARY

The embodiments of the disclosure provide a data transmission method and device, which may improve system performance.

A first aspect provides a data transmission method, which may include that: a terminal device receives indication information from a network device, the indication information indicating a first downlink scheduling time-domain resource in a first time-frequency resource region and a frequency-domain resource in the first time-frequency resource region being a part of a system bandwidth; and the terminal device receives data from the network device on the first downlink data time-domain resource according to the indication information.

According to the data transmission method provided in the embodiments of the disclosure, the network device determines the first downlink scheduling time-domain resource in the first time-frequency resource region and sends the indication information configured to indicate the first downlink scheduling time-domain resource to the terminal device, the frequency-domain resource in the first time-frequency resource region being part of the system bandwidth, and the terminal device determines the first downlink scheduling time-domain resource according to the indication information and receives the downlink data from the network device on the first downlink scheduling time-domain resource, so that system performance may be improved, and different service requirements are favorably supported.

Optionally, the first time-frequency resource region may correspond to a scheduling unit on a time domain, and may be part of the system bandwidth on a frequency domain.

Optionally, the indication information may be configured to indicate at least one of a starting symbol, time-domain length or ending symbol of the first downlink data time-domain resource.

Optionally, downlink scheduling time-domain resources in different time-frequency resource regions may be at different time-domain positions.

Optionally, the first downlink scheduling time-domain resource may be different from a second downlink scheduling time-domain resource in a second time-frequency resource region, and the first time-frequency resource region and the second time-frequency resource region may correspond to a same time-domain resource and correspond to different frequency-domain resources respectively.

Optionally, the first downlink scheduling time-domain resource is different from the second downlink scheduling time-domain resource in the second time-frequency resource region may lie in that: the starting symbol of the first downlink scheduling time-domain resource is different from a starting symbol of the second downlink scheduling time-domain resource; and/or the time-domain length of the first downlink scheduling time-domain resource is different from a time-domain length of the second downlink scheduling time-domain resource.

In a first possible implementation of the first aspect, the starting symbol of the first downlink data time-domain resource may be a close neighbor after an ending symbol of a control channel resource in the first time-frequency resource region; or the starting symbol of the first downlink data time-domain resource may be spaced from the ending symbol of the control channel resource in the first time-frequency resource region by at least one symbol.

In combination with the abovementioned possible implementation of the first aspect, in a second possible implementation of the first aspect, the indication information may include information about the control channel resource in the first time-frequency resource region; and the method may further include that: the terminal device determines the starting symbol of the first downlink data time-domain resource according to the information about the control channel resource.

In combination with the abovementioned possible implementations of the first aspect, in a third possible implementation of the first aspect, the first time-frequency resource region may include a self-contained scheduling unit, and the self-contained scheduling unit may include a downlink transmission time period, an uplink and downlink switching time period and an uplink transmission time period.

In such case, optionally, the indication information may include information about the uplink and downlink switching time period in the self-contained scheduling unit; and the method may further include that: the terminal device determines the ending symbol of the first downlink data time-domain resource according to the information about the uplink and downlink switching time period.

In combination with the abovementioned possible implementations of the first aspect, in a fourth possible implementation of the first aspect, the operation that the terminal device receives the indication information from the network device may include that: the terminal device receives high-layer signaling from the network device, the high-layer signaling or a physical-layer common signal carrying the indication information; or the terminal device receives a physical-layer common signal from the network device, the physical-layer common signal carrying the indication information; or the terminal device receives a User Equipment (UE)-specific control signal from the network device, the UE-specific control signal carrying the indication information.

In combination with the abovementioned possible implementations of the first aspect, in a fifth possible implementation of the first aspect, the first downlink data time-domain resource may include multiple mini-slots.

In such case, optionally, the indication information may be configured to indicate a total length of the multiple mini-slots. For example, the indication information may include the total number of symbols in the first downlink data time-domain resource.

In combination with the abovementioned possible implementations of the first aspect, in a sixth possible implementation of the first aspect, if the network device configures multiple time-frequency resource regions including the first time-frequency resource region for the terminal device, the multiple time-frequency resource regions having different subcarrier spacings, the indication information may include information about a third downlink scheduling time-domain resource in a third time-frequency resource region, the third time-frequency resource region being the time-frequency resource region with a minimum subcarrier spacing in the multiple time-frequency resource regions; and the method may further include that: the terminal device determines an ending moment of the third downlink data time-domain resource according to the indication information, and the terminal device determines a moment corresponding to the ending symbol of the first downlink data time-domain resource as the ending moment of the third downlink data time-domain resource.

Optionally, the multiple time-frequency resource regions may correspond to a same time-domain resource, and may be configured for downlink data transmission of the terminal device in the same scheduling unit.

Optionally, the multiple time-frequency resource regions may correspond to different frequency bands in a same time-domain resource. In such case, time-domain lengths and/or ending moments of downlink scheduling time-domain resources in the multiple time-frequency resource regions are based on the downlink scheduling time-domain resource in the time-frequency resource region with the minimum subcarrier spacing.

The terminal device may determine the ending moment of the third downlink data time-domain resource as an ending moment of the first downlink scheduling time-domain resource and accordingly determine the ending symbol of the first downlink scheduling time-domain resource.

A second aspect provides another data transmission method, which may include that: a terminal device receives indication information from a network device, the indication information indicating a first uplink scheduling time-domain resource which is configured to transmit uplink data and in a first scheduling unit, a time-domain position of the first uplink scheduling time-domain resource in the first scheduling unit being different from a time-domain position of a second uplink scheduling time-domain resource in a second scheduling unit and the second uplink scheduling time-domain resource being a time-domain resource which is configured to transmit the uplink data and in the second scheduling unit; and the terminal device sends data to the network device on the first uplink scheduling time-domain resource according to the indication information.

Optionally, uplink scheduling time-domain resources in different scheduling units may be at different positions.

Optionally, the indication information may be configured to indicate at least one of a starting symbol, time-domain length or ending symbol of the first uplink scheduling time-domain resource.

Optionally, that the first uplink scheduling time-domain resource is different from the second uplink scheduling time-domain resource may include that: the starting symbol of the first uplink scheduling time-domain resource is different from a starting symbol of the second uplink scheduling time-domain resource; and/or the time-domain length of the first uplink scheduling time-domain resource is different from a time-domain length of the second uplink scheduling time-domain resource.

Optionally, the first scheduling unit may specifically be a self-contained scheduling unit, and the self-contained scheduling unit may include a downlink transmission time period, an uplink and downlink switching time period and an uplink transmission time period.

In a first possible implementation of the second aspect, the starting symbol of the first uplink scheduling time-domain resource may be a starting symbol of a short-format control channel, and the ending symbol of the first uplink scheduling time-domain resource may be an ending symbol of the control channel of the short format.

In combination with the abovementioned possible implementation of the second aspect, in a second possible implementation of the second aspect, the starting symbol of the first uplink scheduling time-domain resource may be a first symbol immediately next to the uplink and downlink switching time period, and the ending symbol of the first uplink scheduling time-domain resource may be a symbol immediately previous to the control channel of the short format.

In combination with the abovementioned possible implementations of the second aspect, in a third possible implementation of the second aspect, the starting symbol of the first uplink scheduling time-domain resource may be a first symbol immediately next to the uplink and downlink switching time period, and the ending symbol of the first uplink scheduling time-domain resource may be the ending symbol of the control channel of the short format.

In combination with the abovementioned possible implementations of the second aspect, in a fourth possible implementation of the second aspect, the operation that the terminal device receives the indication information from the network device may include that: the terminal device receives high-layer signaling from the network device, the high-layer signaling or a physical-layer common signal carrying the indication information; or the terminal device receives a physical-layer common signal from the network device, the physical-layer common signal carrying the indication information; or the terminal device receives a UE-specific control signal transmitted by the network device, the UE-specific control signal carrying the indication information.

Optionally, the first uplink scheduling time-domain resource may include multiple mini-slots. In such case, optionally, the indication information may be configured to indicate a total length of the multiple mini-slots.

In combination with the abovementioned possible implementations of the second aspect, in a fifth possible implementation of the second aspect, if the network device configures multiple time-frequency resource regions in the first scheduling unit for the terminal device, the multiple time-frequency resource regions having different subcarrier spacings, the indication information may include information about a third uplink scheduling time-domain resource in a third time-frequency resource region, the third time-frequency resource region being the time-frequency resource region with a minimum subcarrier spacing in the multiple time-frequency resource regions; and the method may further include that: the terminal device determines an ending moment of the third uplink data time-domain resource according to the indication information, and the terminal device determines a moment corresponding to the ending symbol of the first uplink data time-domain resource to be the ending moment of the third uplink data time-domain resource.

Optionally, the multiple time-frequency resource regions may correspond to different frequency bands in the first scheduling unit. In such case, time-domain lengths and/or ending moments of uplink scheduling time-domain resources in the multiple time-frequency resource regions are based on the uplink scheduling time-domain resource in the time-frequency resource region with the minimum subcarrier spacing. Herein, the time-frequency resource region with the minimum subcarrier spacing may correspond to a maximum time interval.

The terminal device may determine the ending moment of the third uplink data time-domain resource as an ending moment of the first uplink scheduling time-domain resource and accordingly determine the ending symbol of the first uplink scheduling time-domain resource.

A third aspect provides a data transmission method, which may include that: a network device determines a first downlink scheduling time-domain resource in a first time-frequency resource region, a frequency-domain resource in the first time-frequency resource region being a part of a system bandwidth; and the network device sends indication information to a terminal device, the indication information indicating the first downlink scheduling time-domain resource.

Optionally, the indication information may be configured to indicate at least one of a starting symbol, time-domain length or ending symbol of the first downlink data time-domain resource.

Optionally, the first downlink scheduling time-domain resource may be different from a second downlink scheduling time-domain resource in a second time-frequency resource region, and the first time-frequency resource region and the second time-frequency resource region may correspond to a same time-domain resource and correspond to different frequency-domain resources respectively.

Optionally, the first downlink scheduling time-domain resource is different from the second downlink scheduling time-domain resource in the second time-frequency resource region may lie in that: the starting symbol of the first downlink scheduling time-domain resource is different from a starting symbol of the second downlink scheduling time-domain resource; and/or the time-domain length of the first downlink scheduling time-domain resource is different from a time-domain length of the second downlink scheduling time-domain resource.

Optionally, the starting symbol of the first downlink data time-domain resource may be a close neighbor after an ending symbol of a control channel resource in the first time-frequency resource region; or the starting symbol of the first downlink data time-domain resource may be spaced from the ending symbol of the control channel resource in the first time-frequency resource region by at least one symbol.

In a first possible implementation of the third aspect, the indication information may include information about the control channel resource in the first time-frequency resource region.

In combination with the abovementioned possible implementation of the third aspect, in a second possible implementation of the third aspect, the first time-frequency resource region may include a self-contained scheduling unit, and the self-contained scheduling unit may include a downlink transmission time period, an uplink and downlink switching time period and an uplink transmission time period; and the indication information may include information about the uplink and downlink switching time period in the self-contained scheduling unit.

In combination with the abovementioned possible implementations of the third aspect, in a third possible implementation of the third aspect, the operation that the network device sends the indication information to the terminal device may include that: the network device sends high-layer signaling, the high-layer signaling carrying the indication information; or the network device sends a physical-layer common signal, the physical-layer common signal carrying the indication information; or the network device sends a UE-specific control signal to the terminal device, the UE-specific control signal carrying the indication information.

In combination with the abovementioned possible implementations of the third aspect, in a fourth possible implementation of the third aspect, the first downlink data time-domain resource may include time-domain resources of multiple mini-slots, and the indication information may be configured to indicate a total length of the multiple mini-slots.

In combination with the abovementioned possible implementations of the third aspect, in a fifth possible implementation of the third aspect, if the network device configures multiple time-frequency resource regions including the first time-frequency resource region for the terminal device, the multiple time-frequency resource regions having different subcarrier spacings, the indication information may include information about a third downlink scheduling time-domain resource in a third time-frequency resource region, the third time-frequency resource region being the time-frequency resource region with a minimum subcarrier spacing in the multiple time-frequency resource regions.

A fourth aspect provides a data transmission method, which may include that: a network device determines a first uplink scheduling time-domain resource which is configured to transmit uplink data and in a first scheduling unit, a time-domain position of the first uplink scheduling time-domain resource in the first scheduling unit being different from a position of a second uplink scheduling time-domain resource in a second scheduling unit and the second uplink scheduling time-domain resource being a time-domain resource which is configured to transmit the uplink data and in the second scheduling unit; and the network device sends indication information to a terminal device, the indication information indicating the uplink scheduling time-domain resource in the first scheduling unit.

Optionally, the indication information may be configured to indicate at least one of a starting symbol, time-domain length or ending symbol of the first uplink scheduling time-domain resource.

Optionally, that the time-domain resource configured to transmit the uplink data in the first scheduling unit is different from the time-domain resource configured to transmit the uplink data in the second scheduling unit may include that: the starting symbol of the first uplink scheduling time-domain resource is different from a starting symbol of the second uplink scheduling time-domain resource; and/or the time-domain length of the first uplink scheduling time-domain resource is different from a time-domain length of the second uplink scheduling time-domain resource.

Optionally, the first scheduling unit may specifically be a self-contained scheduling unit, and the self-contained scheduling unit may include a downlink transmission time period, an uplink and downlink switching time period and an uplink transmission time period.

In a first possible implementation of the fourth aspect, the starting symbol of the first uplink scheduling time-domain resource may be a starting symbol of a control channel of a short format, and the ending symbol of the first uplink scheduling time-domain resource may be an ending symbol of the control channel of the short format.

In combination with the abovementioned possible implementation of the fourth aspect, in a second possible implementation of the fourth aspect, the starting symbol of the first uplink scheduling time-domain resource may be a first symbol immediately next to the uplink and downlink switching time period, and the ending symbol of the first uplink scheduling time-domain resource may be a symbol immediately previous to the control channel of the short format.

In combination with the abovementioned possible implementations of the fourth aspect, in a third possible implementation of the fourth aspect, the starting symbol of the first uplink scheduling time-domain resource may be a first symbol immediately next to the uplink and downlink switching time period, and the ending symbol of the first uplink scheduling time-domain resource may be the ending symbol of the control channel of the short format.

In combination with the abovementioned possible implementations of the fourth aspect, in a fourth possible implementation of the fourth aspect, the operation that the network device sends the indication information to the terminal device may include that: the network device sends high-layer signaling, the high-layer signaling carrying the indication information; or the network device sends a physical-layer common signal, the physical-layer common signal carrying the indication information; or the network device sends a UE-specific control signal to the terminal device, the UE-specific control signal carrying the indication information.

Optionally, the first uplink scheduling time-domain resource may include multiple mini-slots. In such case, optionally, the indication information may be configured to indicate a total length of the multiple mini-slots.

In combination with the abovementioned possible implementations of the fourth aspect, in a fifth possible implementation of the fourth aspect, if the network device configures multiple time-frequency resource regions in the first scheduling unit for the terminal device, the multiple time-frequency resource regions having different subcarrier spacings, the indication information may include information about a third uplink scheduling time-domain resource in a third time-frequency resource region, the third time-frequency resource region being the time-frequency resource region with a minimum subcarrier spacing in the multiple time-frequency resource regions.

In some aspects of the disclosure, a starting moment of the first downlink scheduling time-domain resource may be any symbol in the first time-frequency resource region, or may also be any symbol in the scheduling unit corresponding to the first time-frequency resource region.

A fifth aspect provides a data transmission device, which is configured to execute the method in the first aspect or any possible implementation of the first aspect.

Specifically, the device includes units configured to execute the method in the first aspect or any possible implementation of the first aspect.

A sixth aspect provides a data transmission device, which is configured to execute the method in the second aspect or any possible implementation of the second aspect.

Specifically, the device includes units configured to execute the method in the second aspect or any possible implementation of the second aspect.

A seventh aspect provides a data transmission device, which is configured to execute the method in the third aspect or any possible implementation of the third aspect.

Specifically, the device includes units configured to execute the method in the third aspect or any possible implementation of the third aspect.

An eighth aspect provides a data transmission device, which is configured to execute the method in the fourth aspect or any possible implementation of the fourth aspect.

Specifically, the device includes units configured to execute the method in the fourth aspect or any possible implementation of the fourth aspect.

A ninth aspect provides a data transmission device, which includes a memory and a processor. The memory is configured to store an instruction, the processor is configured to execute the instruction stored in the memory, and when the processor executes the instruction stored in the memory, such execution enables the processor to execute the method in the first aspect or any possible implementation of the first aspect.

A tenth aspect provides a data transmission device, which includes a memory and a processor. The memory is configured to store an instruction, the processor is configured to execute the instruction stored in the memory, and when the processor executes the instruction stored in the memory, such execution enables the processor to execute the method in the second aspect or any possible implementation of the second aspect.

An eleventh aspect provides a data transmission device, which includes a memory and a processor. The memory is configured to store an instruction, the processor is configured to execute the instruction stored in the memory, and when the processor executes the instruction stored in the memory, such execution enables the processor to execute the method in the third aspect or any possible implementation of the third aspect.

A twelfth aspect provides a data transmission device, which includes a memory and a processor. The memory is configured to store an instruction, the processor is configured to execute the instruction stored in the memory, and when the processor executes the instruction stored in the memory, such execution enables the processor to execute the method in the fourth aspect or any possible implementation of the fourth aspect.

A thirteenth aspect provides a computer-readable medium, which is configured to store a computer program, the computer program including an instruction configured to execute the method in the first aspect or any possible implementation of the first aspect.

A fourteenth aspect provides a computer-readable medium, which is configured to store a computer program, the computer program including an instruction configured to execute the method in the second aspect or any possible implementation of the second aspect.

A fifteenth aspect provides a computer-readable medium, which is configured to store a computer program, the computer program including an instruction configured to execute the method in the third aspect or any possible implementation of the third aspect.

A sixteenth aspect provides a computer-readable medium, which is configured to store a computer program, the computer program including an instruction configured to execute the method in the fourth aspect or any possible implementation of the fourth aspect.

DETAILED DESCRIPTION

The technical solutions in the embodiments of the disclosure will be described below in conjunction with the drawings in the embodiments of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a future evolved Public Land Mobile Network (PLMN) or a future 5G system.

Figure 1:
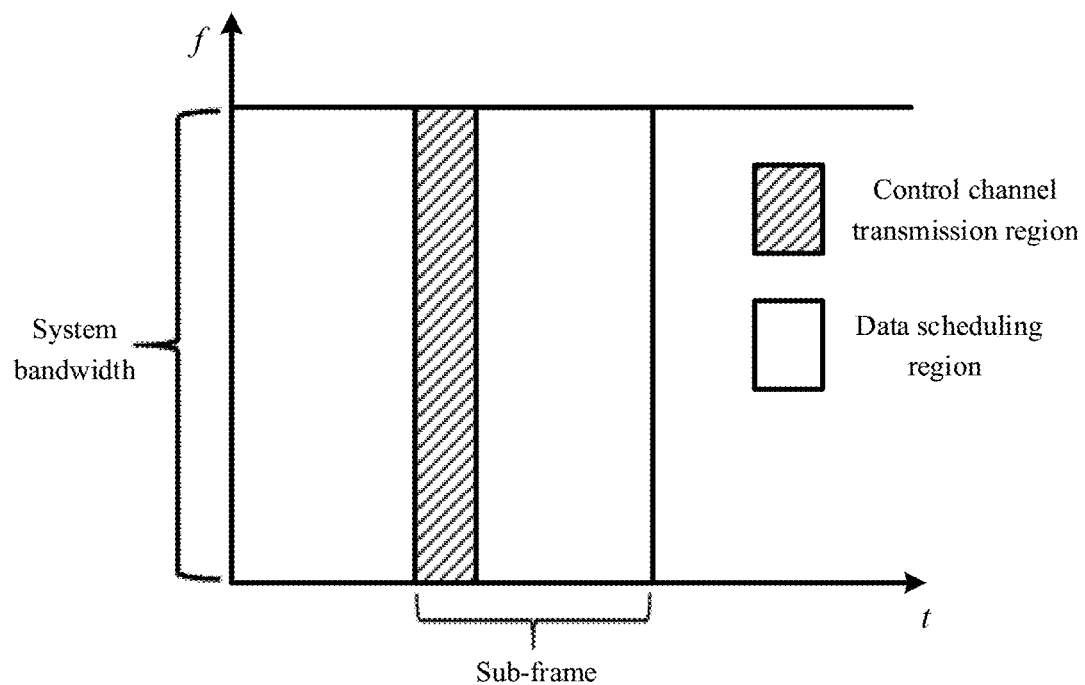
FIG. 1 is a schematic diagram of a typical sub-frame structure.
Figure 2:
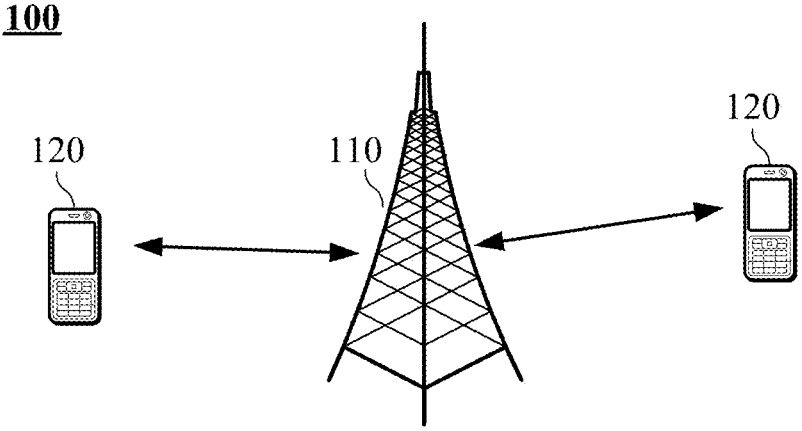
FIG. 2 is a schematic architecture diagram of a wireless communication system to which the embodiments of the disclosure are applied.

FIG. 2 illustrates a wireless communication system 100 to which the embodiments of the disclosure are applied. The wireless communication system 100 may include at least one network device 110. The network device 110 may be a device communicating with a terminal device. Each network device 110 may provide communication coverage for a specific geographical region and may communicate with a terminal device (for example, UE) in the coverage. The network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in the future evolved PLMN or the like.

The wireless communication system 100 further includes multiple terminal devices 120 located within the coverage of the network device 110. The terminal devices 120 may be mobile or fixed. The terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

A network device and two terminal devices are exemplarily illustrated in FIG. 2. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. The embodiments of the disclosure are not limited thereto.

In the wireless communication system 100, a time-frequency resource region may include a control channel resource and a data transmission channel. Herein, the control channel resource may include at least one physical resource block configured to transmit a control channel, and the data transmission resource may include at least one physical resource block for data transmission. The control channel resource may not span the whole system bandwidth but only appears in some physical resource blocks, and then the terminal device is not required to detect the control channel on the whole system bandwidth, so that power consumption of the terminal device is reduced.

In the embodiments of the disclosure, a scheduling unit may refer to a time-domain resource element implementing a data transmission of the terminal device scheduled by the network device. For example, a scheduling unit may correspond to one or more sub-frames, slots or mini-slots on a time domain. Herein, an uplink/downlink scheduling time-domain resource may refer to a time-domain resource occupied by scheduled data transmission, and may specifically be a time-domain resource configured to transmit uplink/downlink data in the scheduling unit, or may be part of the time-domain resource configured to transmit the uplink/downlink data in the scheduling unit. There are no limits made thereto in the embodiments of the disclosure.

Data transmission time-domain resources in different scheduling units may be at different positions, and for example, have different starting symbols and/or different time-domain lengths. For facilitating data transmitting and/or demodulation of the terminal device, the network device may notify an uplink scheduling time-domain resource and/or downlink scheduling time-domain resource in a specific scheduling unit to the terminal device.

Figure 3:
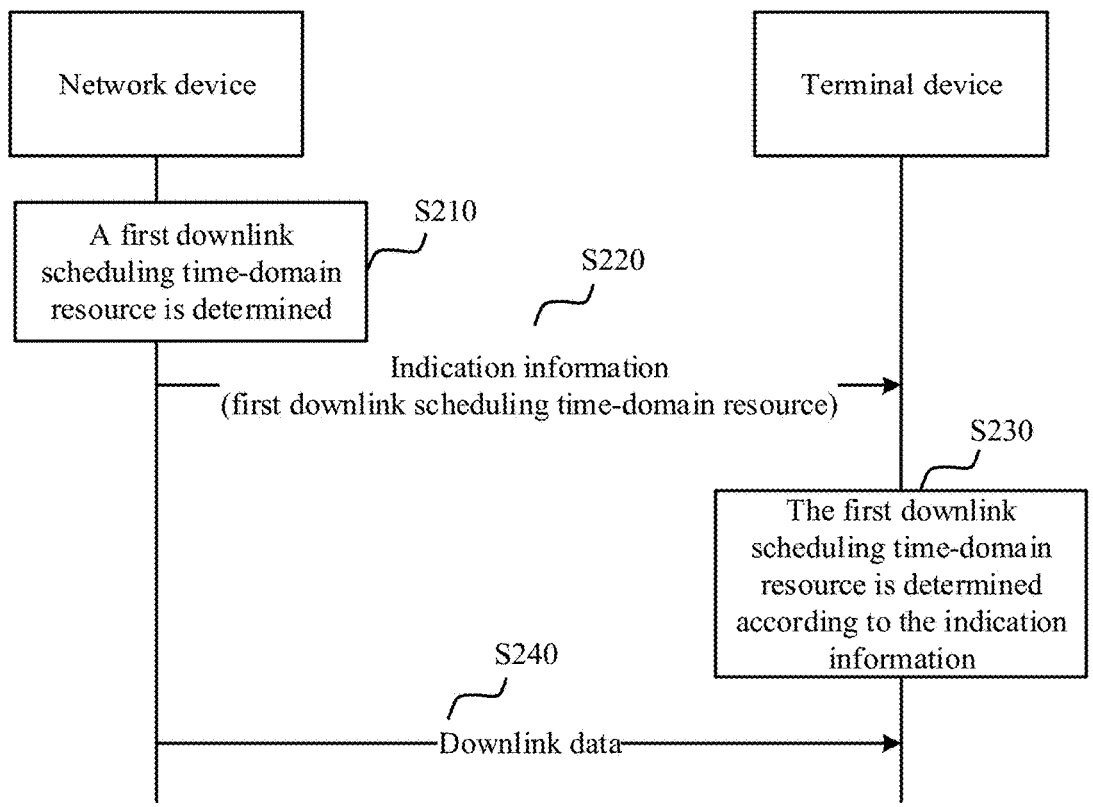
FIG. 3 is a schematic flowchart of a data transmission method according to an embodiment of the disclosure.

FIG. 3 illustrates a transmission method 200 according to an embodiment of the disclosure. The transmission method 200 may be applied to the wireless communication system 100 illustrated in FIG. 2. However, the embodiment of the disclosure is not limited thereto.

In S210, a network device determines a first downlink scheduling time-domain resource in a first time-frequency resource region. The frequency-domain resource in the first time-frequency resource region is a part of a system bandwidth.

The first time-frequency resource region may include multiple physical resource blocks. Optionally, in the embodiment of the disclosure, the time-frequency resource region may correspond to a scheduling unit on a time domain, and may correspond to part of the system bandwidth on a frequency domain. However, the embodiment of the disclosure is not limited thereto. The downlink scheduling time-domain resource may correspond to a data transmission resource configured to transmit downlink data in the time-frequency resource region. However, the embodiment of the disclosure is not limited thereto.

In the embodiment of the disclosure, downlink data time-domain resources in different time-frequency resource regions may be at different positions in the time-frequency resource regions. Optionally, different time-frequency resource regions corresponding to a same time-domain resource and corresponding to different frequency bands may include different downlink data time-domain resources. For example, the first time-frequency resource region and a second time-frequency resource region correspond to a same time-domain resource and correspond to different frequency-domain resources respectively, a starting symbol of the first downlink data time-domain resource in the first time-frequency resource region may be different from a starting symbol of a second downlink data time-domain resource in the second time-frequency resource region, and an ending symbol of the first downlink data time-domain resource is the same as an ending symbol of the second downlink data time-domain resource, for example, both of them are ending symbols of the first time-frequency resource region and the second time-frequency resource region; or, the starting symbol of the first downlink data time-domain resource is the same as the starting symbol of the second downlink data time-domain resource, but a time-domain length of the first downlink data time-domain resource is different from a time-domain length of the second downlink data time-domain resource. The embodiment of the disclosure is not limited thereto.

In S220, the network device sends indication information to a terminal device. The indication information indicates the first downlink scheduling time-domain resource.

Optionally, the indication information may specifically be configured to indicate at least one of the starting symbol, time-domain length and ending symbol of the first downlink data time-domain resource.

Optionally, the network device may transmit high-layer signaling to the terminal device, the high-layer signaling carrying the indication information. Or, the network device may transmit physical-layer signaling to the terminal device, the physical-layer signaling carrying the indication information. Optionally, the physical-layer signaling may specifically be a physical-layer common signal or a UE-specific control signal. There are no limits made thereto in the embodiment of the disclosure. Or, the network device may indicate the downlink scheduling time-domain resource allocated for the terminal device through both of the high-layer signaling or the physical-layer signaling. For example, the network device may indicate a starting symbol (or time-domain length) of a downlink data time-domain resource in each time-frequency resource region through the high-layer signaling and indicate the time-domain length (or starting symbol) of the downlink data time-domain resource allocated for the terminal device through the physical-layer signaling. Or, the network device may indicate the downlink scheduling time-domain resource allocated for the terminal device through secondary Downlink Control Information (DCI). Herein, primary DCI may be configured to indicate the downlink scheduling time-domain resource of each time-frequency resource region, and the secondary DCI may be configured to indicate a specific data scheduling configuration for the terminal device, for example, indicating the downlink scheduling time-domain resource allocated for the terminal device. Then, the terminal device may determine the downlink scheduling time-domain resource allocated by the network device in combination with the primary DCI and the secondary DCI. Optionally, the primary DCI may be a common control channel, and all terminal devices may acquire information from the channel. The secondary DCI may be a UE-specific control channel. The embodiment of the disclosure is not limited thereto.

In S230, the terminal device, after receiving the indication information from the network device, may determine the first downlink scheduling time-domain resource according to the indication information.

As an optional embodiment, the indication information may explicitly indicate the first downlink scheduling time-domain resource. For example, the indication information may include at least one of information about the starting symbol of the first downlink data time-domain resource, information about the time-domain length and information about the ending symbol. For example, the network device may indicate at least one of the starting symbol, time-domain length and ending symbol of the downlink data time-domain resource in each time-frequency resource region through the high-layer signaling. Or, the network device may also dynamically indicate at least one of a starting symbol, time-domain length or ending symbol of at least one physical resource block allocated for the terminal device through the physical-layer signaling. The embodiment of the disclosure is not limited thereto.

As another optional embodiment, the indication information may also implicitly indicate the first downlink scheduling time-domain resource. For example, the indication information may implicitly indicate the first downlink scheduling time-domain resource through information about the control channel resource in the first time-frequency resource region. For example, the indication information may include a time-domain length of the control channel resource. In such case, optionally, the network device may transmit a physical-layer common broadcast signal, the common broadcast signal carrying the indication information. However, the embodiment of the disclosure is not limited thereto.

In such case, the terminal device may determine the first downlink scheduling time-domain resource according to the information, in the indication information, about the control channel resource. For example, the terminal device may determine the starting symbol of the first downlink data time-domain resource according to the time-domain length, in the indication information, of the control channel resource and determine the first downlink scheduling time-domain resource according to the starting symbol of the first downlink data time-domain resource. Specifically, the terminal device may determine an ending symbol of the control channel resource according to the time-domain length of the control channel resource and determine the starting symbol of the first downlink data time-domain resource to be an Nth symbol after the ending symbol of the control channel resource. N may be an integer more than or equal to 1, and a specific numerical value of N may be defined or preconfigured in a protocol. The embodiment of the disclosure is not limited thereto.

Figure 4:
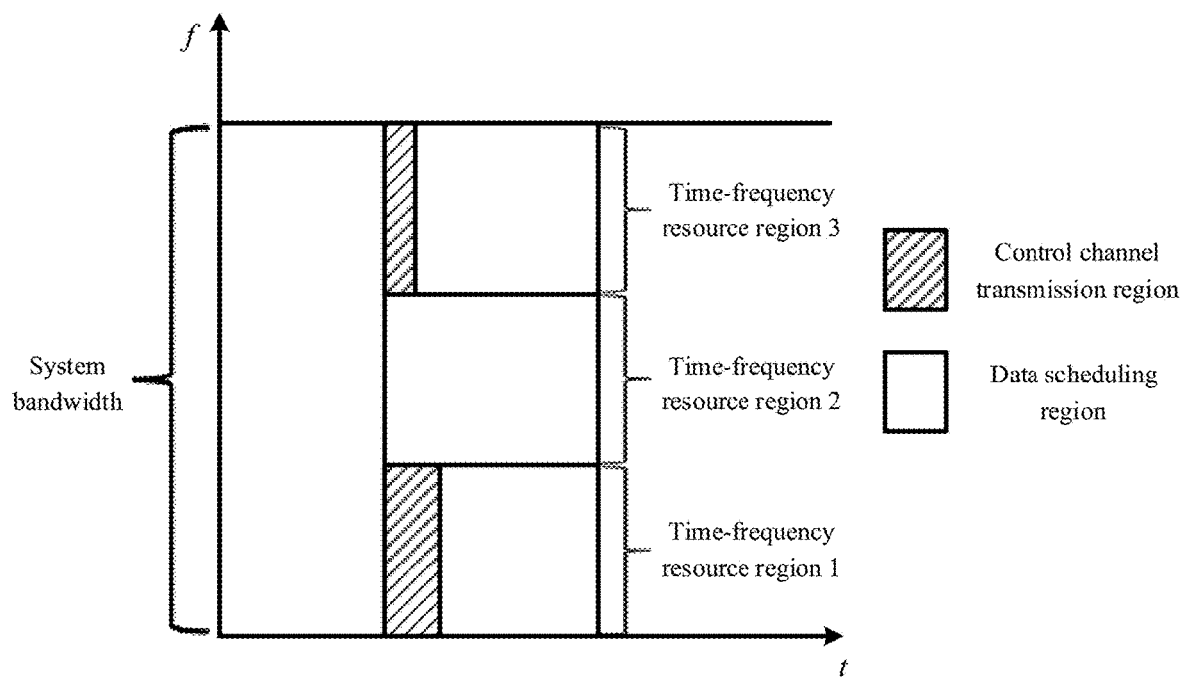
FIG. 4 is a schematic diagram of an example of downlink data time-domain resources in time-frequency resource regions according to an embodiment of the disclosure.

As illustrated in FIG. 4, a time-frequency resource region 1 and a time-frequency resource region 3 include control channel resources, and a time-frequency resource region 2 includes no control channel resource. In such case, starting symbols of downlink data time-domain resources of the time-frequency resource region 1 and the time-frequency resource region 3 may be first symbols after the control channel resources. Time-domain lengths of the control channel resources in the time-frequency resource region 1 and the time-frequency resource region 3 may be different, and correspondingly, the starting symbols of the downlink data time-domain resources in the time-frequency resource region 1 and the time-frequency resource region 3 may be different. Since the time-frequency resource region 2 includes no control channel resource, a starting symbol of a downlink data time-domain resource in the time-frequency resource region 2 may be a first symbol of the time-frequency resource region 2.

Figure 5:
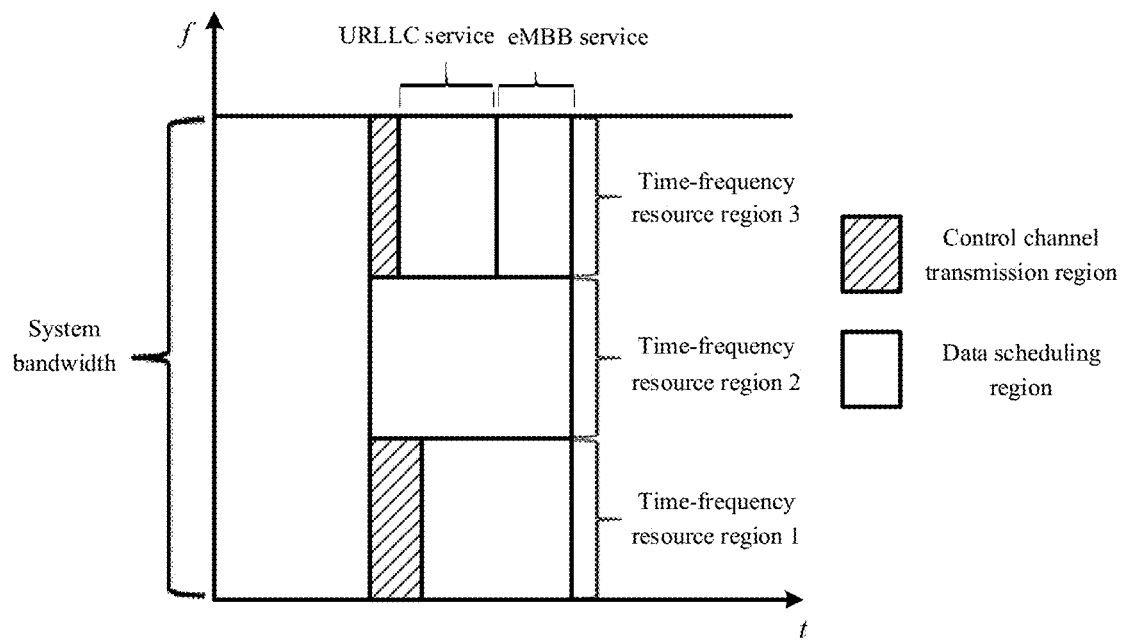
FIG. 5 is a schematic diagram of another example of downlink data time-domain resources in time-frequency resource regions according to an embodiment of the disclosure.

In the example illustrated in FIG. 4, the downlink data time-domain resource is a close neighbor after the control channel resource of the same time-frequency resource region, that is, the starting symbol of the downlink data time-domain resource is a first symbol immediately next to an ending symbol of the control channel resource. Optionally, there may also be a certain time interval between the downlink data time-domain resource and control channel resource in the same time-frequency resource region, that is, the starting symbol of the downlink data time-domain resource may be any symbol after the control channel resource. Therefore, a system may support service requirements of different service types. For example, in Coordination of Multiple Points (CoMP), starting symbols of data resources of different network nodes participating in coordination are required to be kept consistent; and in interference coordination of neighbor cells/beams, starting symbols of the neighbor cells/beams may coordinate with each other; and when resource allocation multiplexing for different services is supported, starting symbols of data resources for some delay-insensitive services may be configured after services with high delay requirements. As illustrated in FIG. 5, a data time-domain resource for Enhanced Mobile Broad-Band (eMBB) data is positioned after a data time-domain resource for Ultra Reliability and Low Latency Communication (URLLC).

In such case, the network device may optionally determine the downlink data time-domain resource allocated for the terminal device according to a service type of the terminal device. The network device may transmit the UE-specific control signal to the terminal device. The UE-specific control signal indicates a time domain of the downlink data time-domain resource allocated by the network device for the terminal device. For example, the UE-specific control signal contains the information about the starting symbol of the downlink data time-domain resource. However, the embodiment of the disclosure is not limited thereto.

Optionally, the starting symbol of the first downlink data time-domain resource is a next symbol of the ending symbol of the control channel resource in the first time-frequency resource region; or the starting symbol of the first downlink data time-domain resource is spaced from the ending symbol of the control channel resource in the first time-frequency resource region by at least one symbol.

Optionally, the indication information may specifically be configured to indicate the starting symbol of the first downlink data time-domain resource. In such case, the ending symbol or time-domain length of the first downlink data time-domain resource may be defined or preconfigured in the protocol. For example, the ending symbol of the first downlink data time-domain resource may be an ending symbol of the first time-frequency resource region, and in such case, the terminal device may determine the first downlink scheduling time-domain resource according to the starting symbol and ending symbol of the first downlink data time-domain resource. However, the embodiment of the disclosure is not limited thereto.

Figure 6:
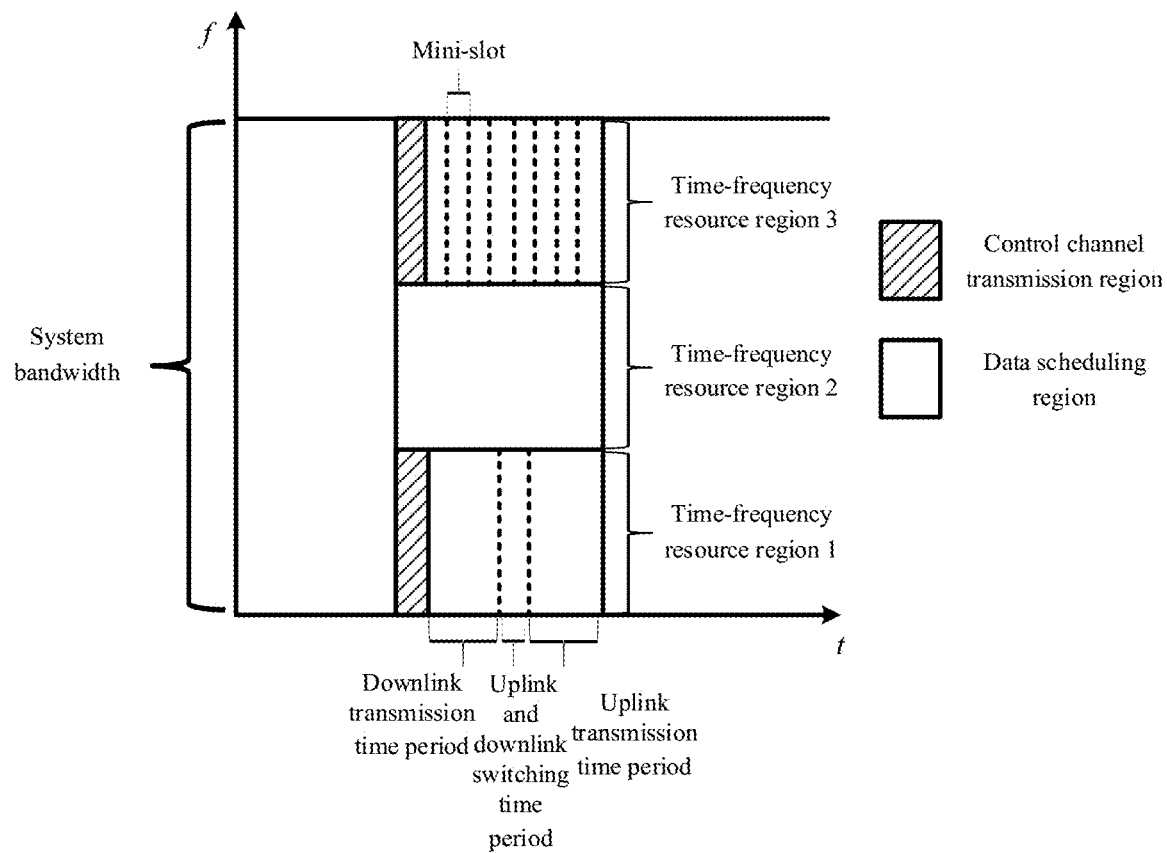
FIG. 6 is a schematic diagram of another example of downlink data time-domain resources in time-frequency resource regions according to an embodiment of the disclosure.

Optionally, the indication information may also be specifically configured to indicate the time-domain length of the first downlink data time-domain resource. For example, as illustrated in FIG. 5, if the service type of the terminal device is eMBB, the network device may optionally transmit the UE-specific control signal to the terminal device. The UE-specific control signal is configured for the time-domain length of the first downlink data time-domain resource allocated by the network device for the terminal device. In such case, the terminal device may determine the ending symbol of the first downlink data time-domain resource to be the ending symbol of the first time-frequency resource region and determine the first downlink scheduling time-domain resource according to the determined ending symbol and the time-domain length indicated by the UE-specific control signal. However, the embodiment of the disclosure is not limited thereto. For another example, as illustrated in FIG. 6, the time-frequency resource region 3 includes multiple mini-slots. Herein, each mini-slot may include four symbols. The first downlink scheduling time-domain resource may include at least two mini-slots. Optionally, the network device may perform cross-mini-slot scheduling. For example, the network device may transmit the UE-specific control signal to the terminal device on a first mini-slot in the time-frequency resource region 3. The UE-specific control signal indicates the time-domain length of the first downlink data time-domain resource. Herein, the first downlink data time-domain resource occupies at least two mini-slots after the first mini-slot. For example, the UE-specific control signal may indicate the number of symbols configured to bear data in the first downlink data time-domain resource. In such case, the terminal device may determine the time-domain length of the first downlink data time-domain resource according to the indication information and determine the first downlink scheduling time-domain resource according to the determined time-domain length. The embodiment of the disclosure is not limited thereto.

Optionally, the indication information may also be specifically configured to indicate the ending symbol of the first downlink data time-domain resource. As illustrated in FIG. 6, the time-frequency resource region 1 corresponds to a self-contained scheduling unit on the time domain. The self-contained scheduling unit may include a downlink transmission time period, an uplink and downlink switching time period and an uplink transmission time period. In such case, the indication information may specifically be configured to indicate the ending symbol of the first downlink data time-domain resource in the downlink transmission time period. For example, the network device may transmit a common control signal, and the common control signal may contain the information about the ending symbol of the first downlink data time-domain resource. Or, the common control signal may contain information about the uplink and downlink switching time period in the self-contained scheduling unit. In such case, the terminal device may determine the first downlink scheduling time-domain resource in the downlink transmission time period according to the information about the uplink and downlink switching time period. For example, the terminal device may determine a starting symbol of the uplink and downlink switching time period according to the information about the uplink and downlink switching time period, determine the ending symbol of the first downlink data time-domain resource to be a symbol immediately previous to the starting symbol of the uplink and downlink switching time period and determine the first downlink scheduling time-domain resource according to the determined ending symbol. Optionally, the starting symbol or time-domain length of the first downlink data time-domain resource may be defined in the protocol, or, the indication information may further contain the information about the starting symbol or time-domain length of the first downlink data time-domain resource or contain the information about the control channel resource. However, the embodiment of the disclosure is not limited thereto.

Figure 7:
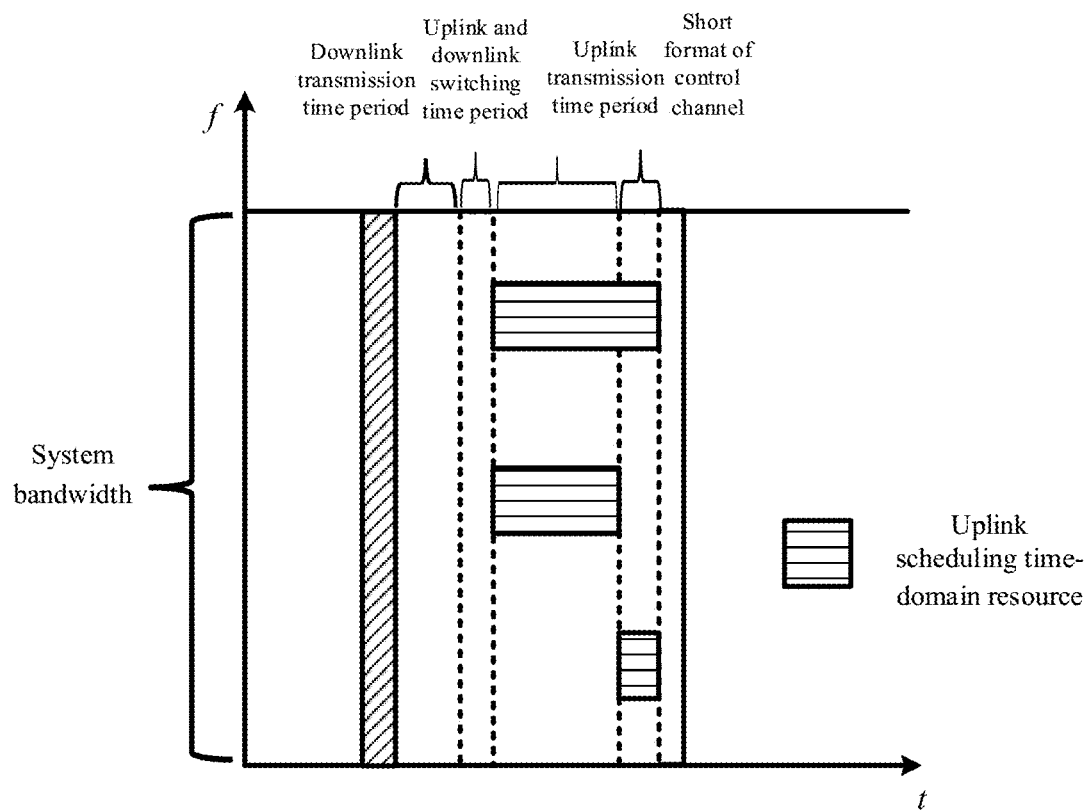
FIG. 7 is a schematic diagram of another example of downlink data time-domain resources in time-frequency resource regions according to an embodiment of the disclosure.

Optionally, since different subcarrier spacings correspond to different symbol lengths, downlink data transmission resources allocated by the network device for the terminal device, if including different subcarrier spacings, correspond to different slot lengths. For increasing a spectrum utilization rate, it may be defined or preconfigured in the protocol that time-domain lengths of multiple downlink data time-domain resources with different subcarrier spacings are kept consistent. For example, downlink data time-domain resources in multiple time-frequency resource regions with different subcarrier spacings may be based on the downlink data time-domain resource in the time-frequency resource region with a largest time-domain granularity, so that it may be ensured that the downlink data time-domain resources at different subcarrier spacings end at the same time. However, the embodiment of the disclosure is not limited thereto. As illustrated in FIG. 7, the network device allocates time-frequency resource regions with three different subcarrier spacings f, 2 f and 4 f for the terminal device, and downlink data time-domain resources in these time-frequency resource regions may be based on the downlink data time-domain resource in the time-frequency resource region with the subcarrier spacing f.

Optionally, if the network device configures multiple time-frequency resource regions including the first time-frequency resource region for the terminal device, the multiple time-frequency resource regions having different subcarrier spacings, the indication information may contain information about a third downlink scheduling time-domain resource in a third time-frequency resource region. The third time-frequency resource region is the time-frequency resource region with a minimum subcarrier spacing in the multiple time-frequency resource regions. In such case, the terminal device may determine an ending moment of the third downlink data time-domain resource according to the indication information and determine an ending moment of the first downlink data time-domain resource as the ending moment of the third downlink data time-domain resource. In such case, a moment corresponding to the ending symbol of the first downlink data time-domain resource is the ending moment of the third downlink data time-domain resource. Therefore, the terminal device may determine the ending symbol of the first downlink data time-domain resource according to the ending moment of the third downlink data time-domain resource. The network device may configure the multiple time-frequency resource regions for downlink data transmission of the terminal device. Herein, the multiple time-frequency resource regions may correspond to a same time-domain resource. Optionally, a starting moment of the first downlink data time-domain resource may be the same as or different from a starting moment of the third downlink data time-domain resource. There are no limits made thereto in the embodiment of the disclosure.

In S240, the terminal device performs data transmission with the network device on the first downlink data time-domain resource.

According to the data transmission method provided in the embodiment of the disclosure, the network device determines the first downlink scheduling time-domain resource in the first time-frequency resource region and sends the indication information configured to indicate the first downlink scheduling time-domain resource to the terminal device. The frequency-domain resource in the first time-frequency resource region is a part of the system bandwidth. The terminal device determines the first downlink scheduling time-domain resource according to the indication information and receives the downlink data from the network device on the first downlink scheduling time-domain resource, so that system performance may be improved, and different service requirements are favorably supported.

Figure 8:
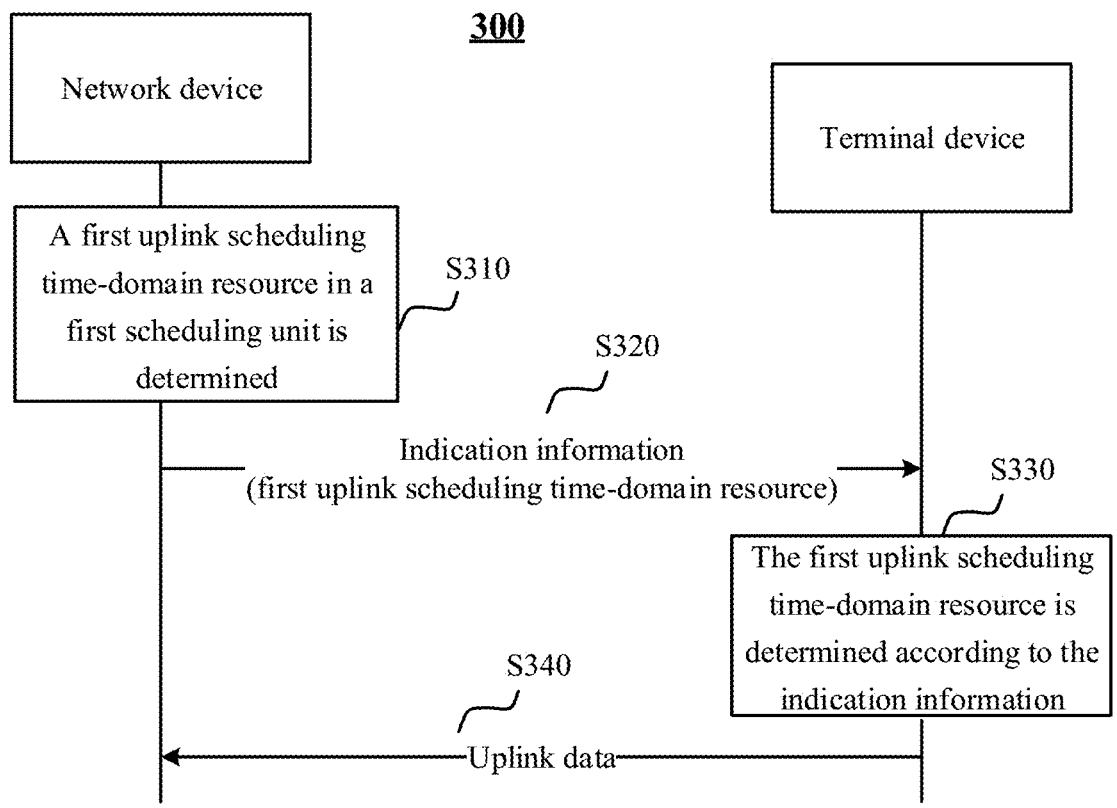
FIG. 8 is a schematic flowchart of a data transmission method according to another embodiment of the disclosure.

FIG. 8 illustrates a transmission method 300 according to an embodiment of the disclosure. The transmission method 300 may be applied to the wireless communication system 100 illustrated in FIG. 2. However, the embodiment of the disclosure is not limited thereto.

In S310, a network device determines an uplink scheduling time-domain resource, called a first uplink scheduling time-domain resource hereinafter, configured to transmit uplink data in a first scheduling unit.

In the embodiment of the disclosure, uplink scheduling time-domain resources in different scheduling units may be at different time-domain positions in the scheduling units, and for example, have different starting symbols and/or different time-domain lengths. For example, a starting symbol of the first uplink scheduling time-domain resource configured to transmit the uplink data in the first scheduling unit is a first symbol of the first scheduling unit, and a starting symbol of a second uplink scheduling time-domain resource configured to transmit the uplink data in a second scheduling unit may be an Mth symbol in the second scheduling unit, where M is an integer larger than 1. The embodiment of the disclosure is not limited thereto.

In S320, the network device sends indication information to a terminal device. The indication information indicates the first uplink scheduling time-domain resource in the first scheduling unit.

Optionally, the indication information may specifically be configured to indicate at least one of the starting symbol, time-domain length and ending symbol of the first uplink scheduling time-domain resource.

Optionally, the network device may transmit high-layer signaling to the terminal device, the high-layer signaling carrying the indication information. Or, the network device may transmit physical-layer signaling to the terminal device, the physical-layer signaling carrying the indication information. Optionally, the physical-layer signaling may specifically be a physical-layer common signal or a UE-specific control signal. There are no limits made thereto in the embodiment of the disclosure. Or, the network device may indicate the uplink scheduling time-domain resource allocated for the terminal device through both of the high-layer signaling or the physical-layer signaling. For example, the network device may indicate a starting symbol (or time-domain length) of an uplink scheduling time-domain resource in each scheduling unit through the high-layer signaling and indicate the time-domain length (or starting symbol) of the uplink scheduling time-domain resource allocated for the terminal device through the physical-layer signaling. Or, the network device may indicate the uplink scheduling time-domain resource allocated for the terminal device through secondary DCI. Herein, primary DCI may be configured to indicate the uplink scheduling time-domain resource in each scheduling unit, and the secondary DCI may be configured to indicate a specific data scheduling configuration for the terminal device, for example, indicating the scheduling unit allocated for the terminal device. Then, the terminal device may determine the uplink scheduling time-domain resource allocated by the network device in combination with the primary DCI and the secondary DCI. Optionally, the primary DCI may be a common control channel, and all terminal devices may acquire information from the channel. The secondary DCI may be a UE-specific control channel. The embodiment of the disclosure is not limited thereto.

In S330, the terminal device, after receiving the indication information from the network device, may determine the first uplink scheduling time-domain resource according to the indication information.

As an optional embodiment, the indication information may explicitly or implicitly indicate the first uplink scheduling time-domain resource. For example, the indication information may include at least one of information about the starting symbol of the first uplink scheduling time-domain resource, information about the time-domain length and information about the ending symbol. For example, the network device may indicate at least one of the starting symbol, time-domain length and ending symbol of the uplink scheduling time-domain resource in each scheduling unit through the high-layer signaling. Or, the network device may also dynamically indicate at least one of a starting symbol, time-domain length or ending symbol of at least one physical resource block allocated for the terminal device through the physical-layer signaling. The embodiment of the disclosure is not limited thereto.

Optionally, the indication information may specifically be configured to indicate the starting symbol of the first uplink scheduling time-domain resource. In such case, the ending symbol or time-domain length of the first uplink scheduling time-domain resource may be defined or preconfigured in the protocol. For example, the ending symbol of the first uplink scheduling time-domain resource may be an ending symbol of the first scheduling unit, and in such case, the terminal device may determine the first uplink scheduling time-domain resource according to the starting symbol and ending symbol of the first uplink scheduling time-domain resource. However, the embodiment of the disclosure is not limited thereto.

Optionally, the first scheduling unit may specifically a self-contained scheduling unit. In such case, the network device may transmit a common control signal, and the common control signal may contain information about the first uplink scheduling time-domain resource. Or, the common control signal may contain information about an uplink and downlink switching time period in the first scheduling unit. In such case, the terminal device may determine the first uplink scheduling time-domain resource according to the information about the uplink and downlink switching time period. For example, the terminal device may determine an ending symbol of the uplink and downlink switching time period according to the information about the uplink and downlink switching time period, determine the starting symbol of the first uplink scheduling time-domain resource to be a first symbol immediately next to the ending symbol of the uplink and downlink switching time period and determine the first uplink scheduling time-domain resource according to the determined starting symbol. However, the embodiment of the disclosure is not limited thereto.

Optionally, the indication information may also be specifically configured to indicate the time-domain length of the first uplink scheduling time-domain resource. For example, the first scheduling unit may include multiple mini-slots. The first uplink scheduling time-domain resource may include at least two mini-slots in the multiple mini-slots. Optionally, the network device may perform cross-mini-slot scheduling. For example, the network device may transmit the UE-specific control signal to the terminal device on a first mini-slot in the first scheduling unit. The UE-specific control signal indicates the time-domain length of the first uplink scheduling time-domain resource. Herein, the first uplink scheduling time-domain resource includes at least two mini-slots after the first mini-slot. For example, the UE-specific control signal may indicate the number of symbols in the first uplink scheduling time-domain resource. In such case, the terminal device may determine the time-domain length of the first uplink scheduling time-domain resource according to the indication information and determine the first uplink scheduling time-domain resource according to the determined time-domain length. The embodiment of the disclosure is not limited thereto.

Optionally, the indication information may also be specifically configured to indicate the ending symbol of the first uplink scheduling time-domain resource. However, the embodiment of the disclosure is not limited thereto.

Figure 9:
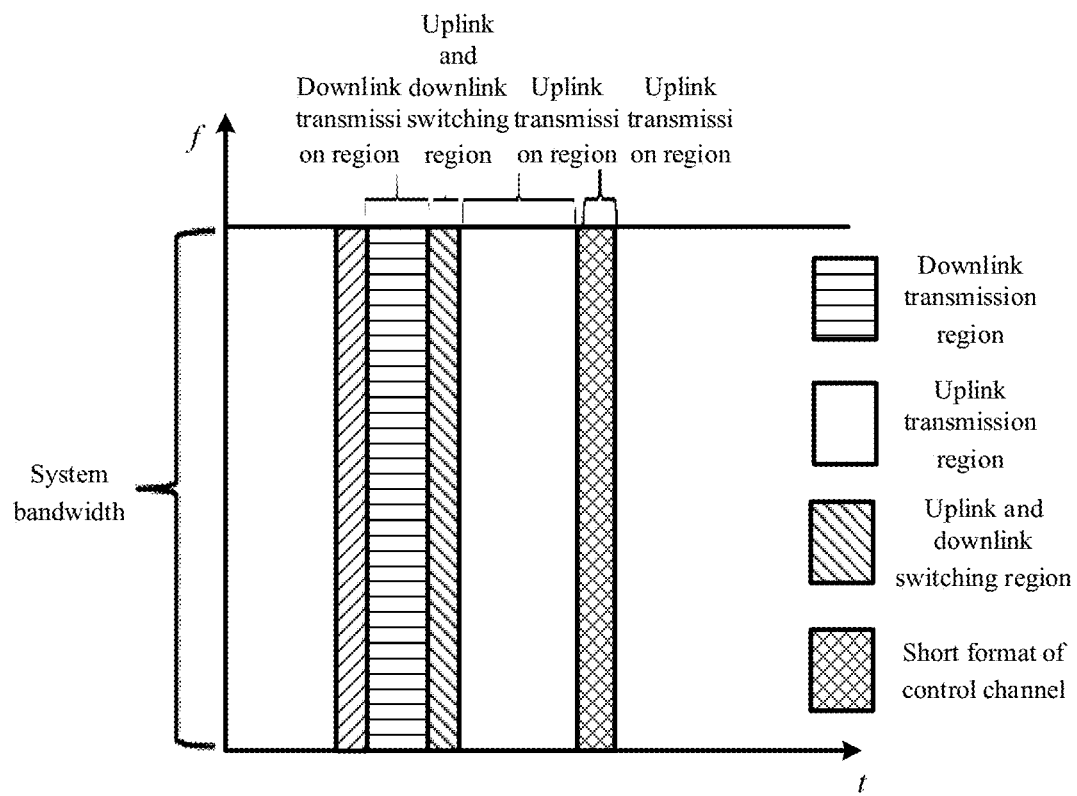
FIG. 9 is a schematic diagram of another example of downlink data time-domain resources in time-frequency resource regions according to an embodiment of the disclosure.

Optionally, uplink scheduling time-domain resources in different self-contained scheduling units may be at different positions. For example, as illustrated in FIG. 9, the starting symbol of the uplink scheduling time-domain resource may specifically be a starting symbol of a control channel of a short format at the tail of a slot, and the ending symbol of the uplink scheduling time-domain resource may specifically be an ending symbol of the control channel of the short format. Or, the starting symbol of the uplink scheduling time-domain resource may be a first symbol immediately next to an uplink and downlink switching symbol, and the ending symbol of the uplink scheduling time-domain resource may be a symbol immediately previous to the starting symbol of the control channel of the short format. Or, the starting symbol of the uplink scheduling time-domain resource may be a first symbol immediately next to the uplink and downlink switching time period, and the ending symbol of the uplink scheduling time-domain resource may be the ending symbol of the control channel of the short format. However, the embodiment of the disclosure is not limited thereto.

Optionally, if uplink data transmission resources allocated by the network device for the terminal device include different subcarrier spacings, it may be defined or preconfigured in the protocol that time-domain lengths of multiple uplink scheduling time-domain resources with different subcarrier spacings are kept consistent. For example, the multiple uplink scheduling time-domain resources with different subcarrier spacings may be based on the uplink scheduling time-domain resource with a largest time-domain granularity. However, the embodiment of the disclosure is not limited thereto.

Optionally, if the network device configures multiple time-frequency resource regions in the first scheduling unit for the terminal device, the multiple time-frequency resource regions having different subcarrier spacings, the indication information may contain information about a third uplink scheduling time-domain resource in a third time-frequency resource region, the third time-frequency resource region is a scheduling unit with a minimum subcarrier spacing in the multiple time-frequency resource regions. In such case, the terminal device may determine an ending moment of the third uplink scheduling time-domain resource according to the indication information and determine a moment corresponding to the ending symbol of the first uplink scheduling time-domain resource to be the ending moment of the third uplink scheduling time-domain resource. Therefore, the terminal device may determine the ending symbol of the first downlink data time-domain resource according to the ending moment of the third downlink data time-domain resource. The network device may configure the multiple time-frequency resource regions for uplink data transmission of the terminal device in the first scheduling unit. Optionally, a starting moment of the first uplink scheduling time-domain resource may be the same as or different from a starting moment of the third uplink scheduling time-domain resource. There are no limits made thereto in the embodiment of the disclosure.

In S340, the terminal device performs data transmission with the network device on the first uplink scheduling time-domain resource.

According to the data transmission method provided in the embodiment of the disclosure, the network device determines the first uplink scheduling time-domain resource in the first scheduling unit and sends the indication information configured to indicate the first uplink scheduling time-domain resource to the terminal device, and the terminal device determines the first uplink scheduling time-domain resource according to the indication information and sends the uplink data to the network device on the first uplink scheduling time-domain resource, so that system performance may be improved, and different service requirements are favorably supported.

It is to be understood that magnitudes of sequence numbers of each process are not intended to represent an execution sequence and the execution sequence of each process should be determined by their functions and internal logic and shall not form any limit to an implementation process of the embodiments of the disclosure.

It is also to be understood that the examples of FIG. 4 to FIG. 7 and FIG. 9 are adopted not to limit the scope of the embodiments of the disclosure but only to help those skilled in the art to better understand the embodiments of the disclosure. It is apparent that those skilled in the art may make various equivalent modifications or variations according to the illustrated examples, and such modifications or variations shall also fall within the scope of the embodiments of the disclosure.

The data transmission method according to the embodiments of the disclosure is described above in combination with FIG. 2 to FIG. 9 in detail. A data transmission device according to the embodiments of the disclosure will be described below in combination with FIG. 10 to FIG. 17 in detail.

Figure 10:
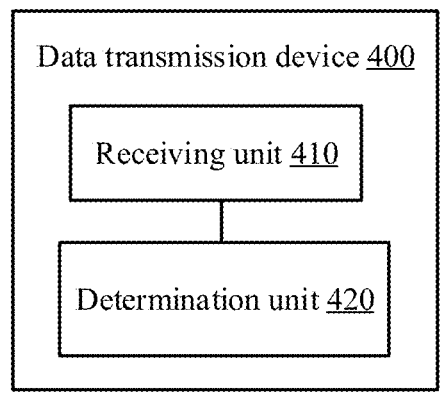
FIG. 10 is a schematic block diagram of a data transmission device according to an embodiment of the disclosure.

FIG. 10 illustrates a data transmission device 400 according to an embodiment of the disclosure, which includes a receiving unit 410 and a determination unit 420.

The receiving unit 410 is configured to receive indication information from a network device. The indication information indicates a first downlink scheduling time-domain resource in a first time-frequency resource region and a frequency-domain resource in the first time-frequency resource region is a part of a system bandwidth.

The determination unit 420 is configured to determine the first downlink scheduling time-domain resource according to the indication information received by the receiving unit 410.

The receiving unit 410 is further configured to receive data from the network device on the first downlink data time-domain resource determined by the determination unit 420.

Optionally, the indication information is configured to indicate at least one of a starting symbol, time-domain length or ending symbol of the first downlink data time-domain resource.

Optionally, the first downlink scheduling time-domain resource is different from a second downlink scheduling time-domain resource in a second time-frequency resource region, and the first time-frequency resource region and the second time-frequency resource region correspond to a same time-domain resource and correspond to different frequency-domain resources respectively.

Optionally, that the first downlink scheduling time-domain resource is different from the second downlink scheduling time-domain resource in the second time-frequency resource region includes that:

the starting symbol of the first downlink scheduling time-domain resource is different from a starting symbol of the second downlink scheduling time-domain resource; and/or the time-domain length of the first downlink scheduling time-domain resource is different from a time-domain length of the second downlink scheduling time-domain resource.

Optionally, a starting symbol of the first downlink data time-domain resource is immediately next to an ending symbol of a control channel resource in the first time-frequency resource region; or the starting symbol of the first downlink data time-domain resource is a spaced from the ending symbol of the control channel resource in the first time-frequency resource region by at least one symbol.

Optionally, the indication information includes information about the control channel resource in the first time-frequency resource region. In such case, the determination unit 420 is specifically configured to determine the starting symbol of the first downlink data time-domain resource according to the information about the control channel resource.

Optionally, the first time-frequency resource region includes a self-contained scheduling unit, and the self-contained scheduling unit includes a downlink transmission time period, an uplink and downlink switching time period and an uplink transmission time period.

In such case, optionally, the indication information includes information about the uplink and downlink switching time period in the self-contained scheduling unit. Correspondingly, the determination unit 420 is specifically configured to determine the ending symbol of the first downlink data time-domain resource according to the information about the uplink and downlink switching time period.

Optionally, the receiving unit 410 is specifically configured to receive high-layer signaling from the network device, the high-layer signaling or a physical-layer common signal carrying the indication information; or the receiving unit 410 is specifically configured to receive the physical-layer signal from the network device, the physical-layer common signal carrying the indication information; or the receiving unit 410 is specifically configured to receive a UE-specific control signal transmitted by the network device, the UE-specific control signal carrying the indication information.

Optionally, the first downlink data time-domain resource includes multiple mini-slots, and the indication information is configured to indicate a total length of the multiple mini-slots.

Optionally, if the network device configures multiple time-frequency resource regions including the first time-frequency resource region for the terminal device, the multiple time-frequency resource regions having different subcarrier spacings, the indication information includes information about a third downlink scheduling time-domain resource in a third time-frequency resource region. The third time-frequency resource region is the time-frequency resource region with a minimum subcarrier spacing in the multiple time-frequency resource regions. Correspondingly, the determination unit 420 is specifically configured to determine an ending moment of the third downlink data time-domain resource according to the indication information and determine a moment corresponding to the ending symbol of the first downlink data time-domain resource as the ending moment of the third downlink data time-domain resource.

It is to be understood that the device 400 described herein is embodied in form of functional unit. In an optional example, those skilled in the art may know that the device 400 may specifically be the terminal device in the abovementioned embodiments and the device 400 may be configured to execute each flow and/or step corresponding to the terminal device in the abovementioned method embodiments, which will not be elaborated herein for avoiding repetitions.

Figure 11:
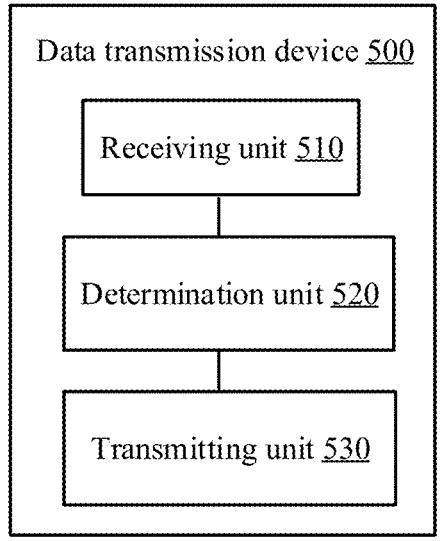
FIG. 11 is a schematic block diagram of a data transmission device according to another embodiment of the disclosure.

FIG. 11 illustrates a data transmission device 500 according to another embodiment of the disclosure, which includes a receiving unit 510, a determination unit 520 and a transmitting unit 530.

The receiving unit 510 is configured to receive indication information from a network device. The indication information indicates a first uplink scheduling time-domain resource which is configured to transmit uplink data and in a first scheduling unit. A time-domain position of the first uplink scheduling time-domain resource in the first scheduling unit is different from a time-domain position of a second uplink scheduling time-domain resource in a second scheduling unit and the second uplink scheduling time-domain resource is a time-domain resource which is configured to transmit the uplink data and in the second scheduling unit.

The determination unit 520 is configured to determine the first uplink scheduling time-domain resource according to the indication information received by the receiving unit 510.

The transmitting unit 530 is configured to transmit data to the network device on the first uplink scheduling time-domain resource determined by the determination unit 520.

Optionally, the indication information is configured to indicate at least one of a starting symbol, time-domain length or ending symbol of the first uplink scheduling time-domain resource.

Optionally, that the first uplink scheduling time-domain resource is different from a second uplink scheduling time-domain resource includes that:

the starting symbol of the first uplink scheduling time-domain resource is different from a starting symbol of the second uplink scheduling time-domain resource; and/or the time-domain length of the first uplink scheduling time-domain resource is different from a time-domain length of the second uplink scheduling time-domain resource.

Optionally, the first scheduling unit is specifically a self-contained scheduling unit, and the self-contained scheduling unit includes a downlink transmission time period, an uplink and downlink switching time period and an uplink transmission time period.

Optionally, the starting symbol of the first uplink scheduling time-domain resource is a starting symbol of a control channel of a short format, and the ending symbol of the first uplink scheduling time-domain resource is an ending symbol of the control channel of the short format.

Optionally, the starting symbol of the first uplink scheduling time-domain resource is a first symbol immediately next to the uplink and downlink switching time period, and the ending symbol of the first uplink scheduling time-domain resource is a symbol immediately previous to the control channel of the short format.

Optionally, the starting symbol of the first uplink scheduling time-domain resource is a first symbol immediately next to the uplink and downlink switching time period, and the ending symbol of the first uplink scheduling time-domain resource is the ending symbol of the control channel of the short format.

Optionally, the receiving unit 510 is specifically configured to receive high-layer signaling from the network device, the high-layer signaling or a physical-layer common signal carrying the indication information; or the receiving unit 510 is specifically configured to receive the physical-layer signal from the network device, the physical-layer common signal carrying the indication information; or the receiving unit 510 is specifically configured to receive a UE-specific control signal transmitted by the network device, the UE-specific control signal carrying the indication information.

Optionally, the first uplink scheduling time-domain resource includes multiple mini-slots, and the indication information is configured to indicate a total length of the multiple mini-slots.

Optionally, if the network device configures multiple time-frequency resource regions in the first scheduling unit for the terminal device, the multiple time-frequency resource regions having different subcarrier spacings, the indication information includes information about a third uplink scheduling time-domain resource in a third time-frequency resource region. The third time-frequency resource region is the time-domain resource region with a minimum subcarrier spacing in the multiple time-frequency resource regions.

The determination unit 520 is specifically configured to determine an ending moment of the third uplink data time-domain resource according to the indication information and determine a moment corresponding to the ending symbol of the first uplink data time-domain resource to be the ending moment of the third uplink data time-domain resource.

It is to be understood that the device 500 described herein is embodied in form of functional unit. In an optional example, those skilled in the art may know that the device 500 may specifically be the terminal device in the abovementioned embodiments and the device 500 may be configured to execute each flow and/or step corresponding to the terminal device in the abovementioned method embodiments, which will not be elaborated herein for avoiding repetitions.

Figure 12:
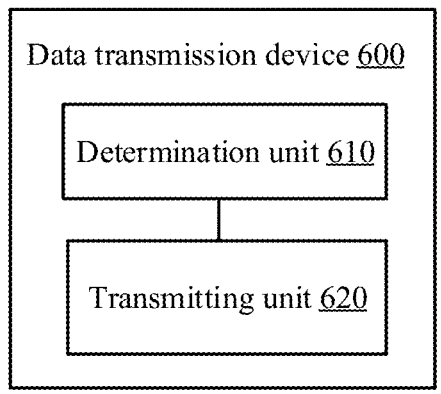
FIG. 12 is a schematic block diagram of a data transmission device according to another embodiment of the disclosure.

FIG. 12 illustrates a data transmission device 600 according to another embodiment of the disclosure, which includes a determination unit 610 and a transmitting unit 620.

The determination unit 610 is configured to determine a first downlink scheduling time-domain resource in a first time-frequency resource region. The frequency-domain resource in the first time-frequency resource region is a part of a system bandwidth.

The transmitting unit 620 is configured to transmit indication information to a terminal device. The indication information indicates the first uplink scheduling time-domain resource determined by the determination unit 610.

Optionally, the indication information is configured to indicate at least one of a starting symbol, time-domain length or ending symbol of the first downlink data time-domain resource.

Optionally, the first downlink scheduling time-domain resource is different from a second downlink scheduling time-domain resource in a second time-frequency resource region, and the first time-frequency resource region and the second time-frequency resource region correspond to a same time-domain resource and correspond to different frequency-domain resources respectively.

Optionally, that the first downlink scheduling time-domain resource is different from the second downlink scheduling time-domain resource in the second time-frequency resource region includes that:

the starting symbol of the first downlink scheduling time-domain resource is different from a starting symbol of the second downlink scheduling time-domain resource; and/or the time-domain length of the first downlink scheduling time-domain resource is different from a time-domain length of the second downlink scheduling time-domain resource.

Optionally, a starting symbol of the first downlink data time-domain resource is immediately next to an ending symbol of a control channel resource in the first time-frequency resource region; or the starting symbol of the first downlink data time-domain resource is a spaced from the ending symbol of the control channel resource in the first time-frequency resource region by at least one symbol.

Optionally, the indication information includes information about the control channel resource in the first time-frequency resource region.

Optionally, the first time-frequency resource region includes a self-contained scheduling unit, and the self-contained scheduling unit includes a downlink transmission time period, an uplink and downlink switching time period and an uplink transmission time period. In such case, the indication information optionally includes information about the uplink and downlink switching time period in the self-contained scheduling unit.

Optionally, the transmitting unit 620 is specifically configured to transmit high-layer signaling, the high-layer signaling carrying the indication information; or the transmitting unit 620 is specifically configured to transmit a physical-layer signal, the physical-layer common signal carrying the indication information; or the transmitting unit 620 is specifically configured to receive a UE-specific control signal to the terminal device, the UE-specific control signal carrying the indication information.

Optionally, the first downlink data time-domain resource includes multiple mini-slots, and the indication information is configured to indicate a total length of the multiple mini-slots.

Optionally, if a network device configures multiple time-frequency resource regions including the first time-frequency resource region for the terminal device, the multiple time-frequency resource regions having different subcarrier spacings, the indication information includes information about a third downlink scheduling time-domain resource in a third time-frequency resource region. The third time-frequency resource region is the time-frequency resource region with a minimum subcarrier spacing in the multiple time-frequency resource regions.

It is to be understood that the device 600 described herein is embodied in form of functional unit. In an optional example, those skilled in the art may know that the device 600 may specifically be the network device in the abovementioned embodiments and the device 600 may be configured to execute each flow and/or step corresponding to the network device in the abovementioned method embodiments, which will not be elaborated herein for avoiding repetitions.

Figure 13:
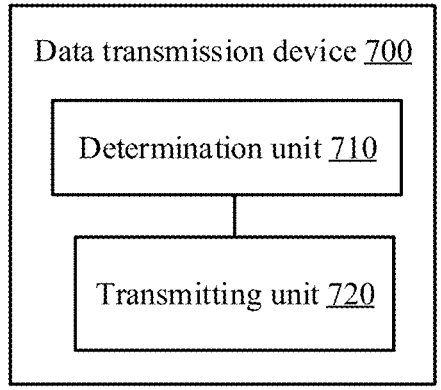
FIG. 13 is a schematic block diagram of a data transmission device according to another embodiment of the disclosure.

FIG. 13 illustrates a data transmission device 700 according to another embodiment of the disclosure, which includes a determination unit 710 and a transmitting unit 720.

The determination unit 710 is configured to determine a first uplink scheduling time-domain resource which is configured to transmit uplink data and in a first scheduling unit. A position of the first uplink scheduling time-domain resource in the first scheduling unit is different from a position of a second uplink scheduling time-domain resource in a second scheduling unit and the second uplink scheduling time-domain resource is a time-domain resource which is configured to transmit the uplink data and in the second scheduling unit.

The transmitting unit 720 is configured to transmit indication information to a terminal device. The indication information indicates the first uplink scheduling time-domain resource, determined by the determination unit 710, in the first scheduling unit.

Optionally, the indication information is configured to indicate at least one of a starting symbol, time-domain length or ending symbol of the first uplink scheduling time-domain resource.

Optionally, that the time-domain resource which is configured to transmit uplink data and in the first scheduling unit is different from the time-domain resource configured to transmit the uplink data in the second scheduling unit includes that:

the starting symbol of the first uplink scheduling time-domain resource is different from a starting symbol of the second uplink scheduling time-domain resource; and/or the time-domain length of the first uplink scheduling time-domain resource is different from a time-domain length of the second uplink scheduling time-domain resource.

Optionally, the first scheduling unit is specifically a self-contained scheduling unit, and the self-contained scheduling unit includes a downlink transmission time period, an uplink and downlink switching time period and an uplink transmission time period.

Optionally, the starting symbol of the first uplink scheduling time-domain resource is a starting symbol of a control channel of a short format, and the ending symbol of the first uplink scheduling time-domain resource is an ending symbol of the control channel of the short format.

Optionally, the starting symbol of the first uplink scheduling time-domain resource is a first symbol immediately next to the uplink and downlink switching time period, and the ending symbol of the first uplink scheduling time-domain resource is a symbol immediately previous to the control channel of the short format.

Optionally, the starting symbol of the first uplink scheduling time-domain resource is a first symbol immediately next to the uplink and downlink switching time period, and the ending symbol of the first uplink scheduling time-domain resource is the ending symbol of the control channel of the short format.

Optionally, the transmitting unit 720 is specifically configured to transmit high-layer signaling, the high-layer signaling carrying the indication information; or the transmitting unit 720 is specifically configured to transmit a physical-layer signal, the physical-layer common signal carrying the indication information; or the transmitting unit 720 is specifically configured to receive a UE-specific control signal to the terminal device, the UE-specific control signal carrying the indication information.

Optionally, the first uplink scheduling time-domain resource includes multiple mini-slots, and the indication information is configured to indicate a total length of the multiple mini-slots.

Optionally, if a network device configures multiple time-frequency resource regions in the first scheduling unit for the terminal device, the multiple time-frequency resource regions having different subcarrier spacings, the indication information includes information about a third uplink scheduling time-domain resource in a third time-frequency resource region. The third time-frequency resource region is the time-domain resource region with a minimum subcarrier spacing in the multiple time-frequency resource regions.

It is to be understood that the device 700 described herein is embodied in form of functional unit. In an optional example, those skilled in the art may know that the device 700 may specifically be the network device in the abovementioned embodiments and the device 700 may be configured to execute each flow and/or step corresponding to the network device in the abovementioned method embodiments, which will not be elaborated herein for avoiding repetitions.

It is also to be understood that term "unit" in the embodiments of the disclosure may refer to an Application Specific Integrated Circuit (ASIC), an electronic circuit, a processor (for example, a shared processor, a dedicated processor or a group processor) and memory configured to execute one or more software or firmware programs, a merged logic circuit and/or another proper component supporting the described functions.

Figure 14:
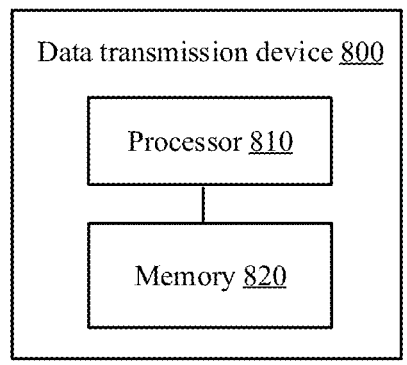
FIG. 14 is a schematic block diagram of a data transmission device according to another embodiment of the disclosure.

FIG. 14 illustrates a data transmission device 800 according to an embodiment of the disclosure, which includes a processor 810 and a memory 820. Herein, the memory 820 is configured to store an instruction, and the processor 810 is configured to execute the instruction stored in the memory 810. Herein, executing the instruction enables the processor 810 to execute the following operations:

receiving indication information from a network device, the indication information indicating a first downlink scheduling time-domain resource in a first time-frequency resource region and a frequency-domain resource in the first time-frequency resource region being a part of a system bandwidth;

determining the first downlink scheduling time-domain resource according to the indication information; and receiving data from the network device on the first downlink data time-domain resource.

Optionally, the indication information includes information about a control channel resource in the first time-frequency resource region. In such case, the processor 810 is specifically configured to determine a starting symbol of the first downlink data time-domain resource according to the information about the control channel resource.

In such case, optionally, the indication information includes information about an uplink and downlink switching time period in a self-contained scheduling unit. Correspondingly, the processor 810 is specifically configured to determine an ending symbol of the first downlink data time-domain resource according to the information about the uplink and downlink switching time period.

Optionally, if the network device configures multiple time-frequency resource regions including the first time-frequency resource region for a terminal device, the multiple time-frequency resource regions having different subcarrier spacings, the indication information includes information about a third downlink scheduling time-domain resource in a third time-frequency resource region. The third time-frequency resource region is the time-frequency resource region with a minimum subcarrier spacing in the multiple time-frequency resource regions. Correspondingly, the processor 810 is specifically configured to determine an ending moment of the third downlink data time-domain resource according to the indication information and determine a moment corresponding to the ending symbol of the first downlink data time-domain resource as the ending moment of the third downlink data time-domain resource.

In an optional example, those skilled in the art may know that the device 800 may specifically be the terminal device in the abovementioned embodiments and the device 800 may be configured to execute each flow and/or step corresponding to the terminal device in the abovementioned method embodiments, which will not be elaborated herein for avoiding repetitions.

Figure 15:
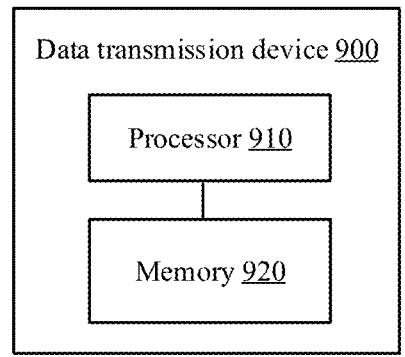
FIG. 15 is a schematic block diagram of a data transmission device according to another embodiment of the disclosure.

FIG. 15 illustrates a data transmission device 900 according to another embodiment of the disclosure, which includes a processor 910 and a memory 920. Herein, the memory 920 is configured to store an instruction, and the processor 910 is configured to execute the instruction stored in the memory 920. Herein, executing the instruction enables the processor 910 to execute the following operations:

receiving indication information from a network device, the indication information indicating a first uplink scheduling time-domain resource which is configured to transmit uplink data and in a first scheduling unit. A time-domain position of the first uplink scheduling time-domain resource in the first scheduling unit is different from a time-domain position of a second uplink scheduling time-domain resource in a second scheduling unit and the second uplink scheduling time-domain resource is a time-domain resource which is configured to transmit the uplink data and in the second scheduling unit;

determining the first uplink scheduling time-domain resource according to the indication information; and send data to the network device on the first uplink scheduling time-domain resource.

In an optional example, those skilled in the art may know that the device 900 may specifically be the terminal device in the abovementioned embodiments and the device 900 may be configured to execute each flow and/or step corresponding to the terminal device in the abovementioned method embodiments, which will not be elaborated herein for avoiding repetitions.

Figure 16:
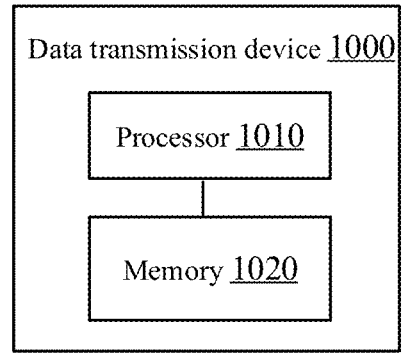
FIG. 16 is a schematic block diagram of a data transmission device according to another embodiment of the disclosure.

FIG. 16 illustrates a data transmission device 1000 according to another embodiment of the disclosure, which includes a processor 1010 and a memory 1020. Herein, the memory 1020 is configured to store an instruction, and the processor 1010 is configured to execute the instruction stored in the memory 1020. Herein, executing the instruction enables the processor 1010 to execute the following operations:

determining a first downlink scheduling time-domain resource in a first time-frequency resource region. The frequency-domain resource in the first time-frequency resource region is a part of a system bandwidth; and transmitting indication information to a terminal device, the indication information indicating the first downlink scheduling time-domain resource.

In an optional example, those skilled in the art may know that the device 1000 may specifically be the network device in the abovementioned embodiments and the device 1000 may be configured to execute each flow and/or step corresponding to the network device in the abovementioned method embodiments, which will not be elaborated herein for avoiding repetitions.

Figure 17:
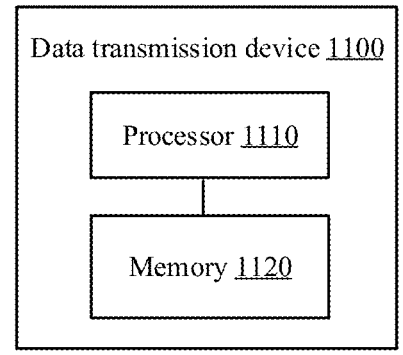
FIG. 17 is a schematic block diagram of a data transmission device according to another embodiment of the disclosure.

FIG. 17 illustrates a data transmission device 1100 according to another embodiment of the disclosure, which includes a processor 1110 and a memory 1120. Herein, the memory 1120 is configured to store an instruction, and the processor 1110 is configured to execute the instruction stored in the memory 1120. Herein, executing the instruction enables the processor 1110 to execute the following operations:

determining a first uplink scheduling time-domain resource which is configured to transmit uplink data and in a first scheduling unit, a position of the first uplink scheduling time-domain resource in the first scheduling unit being different from a position of a second uplink scheduling time-domain resource in a second scheduling unit and the second uplink scheduling time-domain resource being a time-domain resource which is configured to transmit the uplink data and in the second scheduling unit; and transmitting indication information to a terminal device, the indication information indicating the first uplink scheduling time-domain resource in the first scheduling unit.

In an optional example, those skilled in the art may know that the device 1100 may specifically be the network device in the abovementioned embodiments and the device 1100 may be configured to execute each flow and/or step corresponding to the network device in the abovementioned method embodiments, which will not be elaborated herein for avoiding repetitions.

It is to be understood that, in the embodiments of the disclosure, the processor may be a Central Processing Unit (CPU) and the processor may also be another universal processor, a Digital Signal Processor (DSP), an ASIC, a Field-Programmable Gate Array (FPGA) or another programmable logic device, discrete gate or transistor logic device and discrete hardware component and the like. The universal processor may be a microprocessor or the processor may also be any conventional processor and the like.

The memory may include a Read-Only Memory (ROM) and a Random Access Memory (RAM) and provides an instruction and data for the processor. A part of the memory may further include a nonvolatile RAM. For example, the memory may further store information of a device type. The processor may be configured to execute the instruction stored in the memory, and when the processor executes the instruction, the processor may execute each step corresponding to the terminal equipment in the abovementioned method embodiments.

In an implementation process, each step of the method may be completed by an integrated logic circuit of hardware in the processor or an instruction in a software form. The steps of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory, and the processor reads the instruction in the memory, and completes the steps of the method in combination with hardware. No more detailed descriptions will be made herein to avoid repetitions.

It is to be understood that the above descriptions about the embodiments of the disclosure are made with emphasis on differences between each embodiment and the same or similar parts which are not mentioned may refer to each other and will not be elaborated herein for simplicity.

In addition, terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Those of ordinary skill in the art may realize that the steps and units of each method described in combination with the embodiments disclosed in the disclosure may be implemented by electronic hardware, computer software or a combination of the two. For clearly describing exchangeability of hardware and software, the steps and compositions of each embodiment have been generally described in the foregoing descriptions according to functions. Whether these functions are executed in a hardware or software manner depends on specific applications and design constraints of the technical solutions. Those of ordinary skill in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Various equivalent modifications or replacements are apparent to those skilled in the art within the technical scope disclosed by the disclosure shall fall within the scope of protection of the disclosure and these modifications or replacements shall fall within the scope of protection of the disclosure. Therefore, the scope of protection of the disclosure shall be subject to the scope of protection of the claims.

The invention claimed is:

1. A method for data transmission, comprising:
receiving, by a terminal device, indication information from a network device, the indication information indicating a first downlink scheduling time-domain resource in a first time-frequency resource region, the first time-frequency resource region corresponding to a scheduling unit in time-domain, and a frequency-domain resource in the first time-frequency resource region being a part of a system bandwidth, wherein the terminal device is configured by the network device to comprise a plurality of time-frequency resource regions comprising the first time-frequency resource region, each of the plurality of time-frequency resource regions has a different subcarrier spacing, and each of the plurality of time-frequency resource regions corresponds to a different frequency band within a same time-domain resource; and
receiving, by the terminal device, data from the network device on the first downlink scheduling time-domain resource according to the indication information;
wherein the indication information is configured to indicate a starting symbol and time-domain length of the first downlink scheduling time-domain resource.

2. The method of claim 1, wherein a starting symbol of the first downlink scheduling time-domain resource is immediately next to an ending symbol of a control channel resource in the first time-frequency resource region; or
a starting symbol of the first downlink scheduling time-domain resource is a spaced from the ending symbol of the control channel resource in the first time-frequency resource region by at least one symbol.

3. The method of claim 1, wherein receiving, by the terminal device, the indication information from the network device comprises:
receiving, by the terminal device, high-layer signaling from the network device, the high-layer signaling carrying the indication information; or
receiving, by the terminal device, a physical-layer common signal from the network device, the physical-layer common signal carrying the indication information; or
receiving, by the terminal device, a User Equipment, UE-specific control signal from the network device, the UE-specific control signal carrying the indication information.

4. A data transmission method, comprising:
determining, by a network device, a first downlink scheduling time-domain resource in a first time-frequency resource region, the first time-frequency resource region corresponding to a scheduling unit in time-domain, and a frequency-domain resource in the first time-frequency resource region being a part of a system bandwidth, wherein the network device configures a plurality of time-frequency resource regions comprising the first time-frequency resource region for a terminal device, each of the plurality of time-frequency resource regions has a different subcarrier spacing, and each of the plurality of time-frequency resource regions corresponds to a different frequency band within a same time-domain resource; and
transmitting, by the network device, indication information to the terminal device, the indication information indicating the first downlink scheduling time-domain resource;
wherein the indication information is configured to indicate a starting symbol and time-domain length of the first downlink scheduling time-domain resource.

5. The method of claim 4, wherein a starting symbol of the first downlink scheduling time-domain resource is immediately next to an ending symbol of a control channel resource in the first time-frequency resource region; or the starting symbol of the first downlink scheduling time-domain resource is a spaced from an ending symbol of a control channel resource in the first time-frequency resource region by at least one symbol.

6. The method of claim 4, wherein transmitting, by the network device, the indication information to the terminal device comprises:

transmitting, by the network device, high-layer signaling, the high-layer signaling carrying the indication information; or transmitting, by the network device, a physical-layer common signal, the physical-layer common signal carrying the indication information; or transmitting, by the network device, a User Equipment, UE-specific control signal to the terminal device, the UE-specific control signal carrying the indication information.

7. A device for data transmission, comprising:

a transceiver, configured to receive indication information from a network device, the indication information indicating a first downlink scheduling time-domain resource in a first time-frequency resource region, the first time-frequency resource region corresponding to a scheduling unit in time-domain, and a frequency-domain resource in the first time-frequency resource region being a part of a system bandwidth, wherein the device is configured by the network device to comprise a plurality of time-frequency resource regions comprising the first time-frequency resource region, each of the plurality of time-frequency resource regions has a different subcarrier spacing, and each of the plurality of time-frequency resource regions corresponds to a different frequency band within a same time-domain resource; and a processor, configured to determine the first downlink scheduling time-domain resource according to the indication information received by the transceiver, wherein the transceiver is further configured to receive data from the network device on the first downlink scheduling time-domain resource determined by the processor;

wherein the indication information is configured to indicate a starting symbol and time-domain length of the first downlink scheduling time-domain resource.

8. The device of claim 7, wherein the first downlink scheduling time-domain resource is different from a second downlink scheduling time-domain resource in a second time-frequency resource region, and the first time-frequency resource region and the second time-frequency resource region correspond to a same time-domain resource and correspond to different frequency-domain resources respectively.

9. The device of claim 8, wherein that the first downlink scheduling time-domain resource is different from the second downlink scheduling time-domain resource in the second time-frequency resource region in that:

a starting symbol of the first downlink scheduling time-domain resource is different from a starting symbol of the second downlink scheduling time-domain resource; and/or a time-domain length of the first downlink scheduling time-domain resource is different from a time-domain length of the second downlink scheduling time-domain resource.

10. The device of claim 7, wherein a starting symbol of the first downlink scheduling time-domain resource is immediately next to an ending symbol of a control channel resource in the first time-frequency resource region; or a starting symbol of the first downlink scheduling time-domain resource is a spaced from an ending symbol of the control channel resource in the first time-frequency resource region by at least one symbol.

11. The device of claim 7, wherein the scheduling unit corresponds to one or more subframes, time slots or mini-slots.

12. The device of claim 7, wherein the transceiver is configured to receive high-layer signaling from the network device, the high-layer signaling or a physical-layer common signal carrying the indication information; or the transceiver is configured to receive the physical-layer signal from the network device, the physical-layer common signal carrying the indication information; or the transceiver is configured to receive a User Equipment, UE-specific control signal from the network device, the UE-specific control signal carrying the indication information.

13. The device of claim 7, wherein the indication information comprises information about a third downlink scheduling time-domain resource in a third time-frequency resource region, the third time-frequency resource region being the time-frequency resource region with a minimum subcarrier spacing in the plurality of time-frequency resource regions; and the processor is configured to determine an ending moment of the third downlink data time-domain resource according to the indication information and determine a moment corresponding to the ending symbol of the first downlink data time-domain resource as the ending moment of the third downlink data time-domain resource.

14. A device for data transmission, comprising:

a processor, configured to determine a first downlink scheduling time-domain resource in a first time-frequency resource region, the first time-frequency resource region corresponding to a scheduling unit in time-domain, and a frequency-domain resource in the first time-frequency resource region being a part of a system bandwidth, wherein the device configures a plurality of time-frequency resource regions comprising the first time-frequency resource region for a terminal device, each of the plurality of time-frequency resource regions has a different subcarrier spacing, and each of the plurality of time-frequency resource regions corresponds to a different frequency band within a same time-domain resource; and a transceiver, configured to transmit indication information to the terminal device, the indication information indicating the first downlink scheduling time-domain resource determined by the processor;

wherein the indication information is configured to indicate a starting symbol and time-domain length of the first downlink scheduling time-domain resource.

15. The device of claim 14, wherein the first downlink scheduling time-domain resource is different from a second downlink scheduling time-domain resource in a second time-frequency resource region, and the first time-frequency resource region and the second time-frequency resource region correspond to a same time-domain resource and correspond to different frequency-domain resources respectively.

16. The device of claim 15, wherein that the first downlink scheduling time-domain resource is different from the second downlink scheduling time-domain resource in the second time-frequency resource region in that:
- a starting symbol of the first downlink scheduling time-domain resource is different from a starting symbol of the second downlink scheduling time-domain resource; and/or
- a time-domain length of the first downlink scheduling time-domain resource is different from a time-domain length of the second downlink scheduling time-domain resource.

17. The device of claim 14, wherein a starting symbol of the first downlink scheduling time-domain resource is immediately next to an ending symbol of a control channel resource in the first time-frequency resource region; or
- the starting symbol of the first downlink scheduling time-domain resource is a spaced from the ending symbol of the control channel resource in the first time-frequency resource region by at least one symbol.

18. The device of claim 14, wherein the transceiver is configured to transmit high-layer signaling, the high-layer signaling carrying the indication information; or
- the transceiver is configured to transmit a physical-layer signal, the physical-layer common signal carrying the indication information; or
- the transceiver is configured to transmit a User Equipment, UE-specific control signal to the terminal device, the UE-specific control signal carrying the indication information.

19. The device of claim 14, wherein the first downlink scheduling time-domain resource comprises a plurality of mini-slots, and the indication information is configured to indicate a total length of the plurality of mini-slots.

20. The device of claim 14, wherein the processor is configured to determine an ending moment of a third downlink time-domain resource in a third time-frequency resource region as an ending moment of the first downlink scheduling time-domain resource, the third time-frequency resource region being the time-frequency resource region with a minimum subcarrier spacing in the plurality of time-frequency resource regions; and
- the indication information comprises information about the third downlink scheduling time-domain resource.

* * * * *